US011270363B2

(12) United States Patent
Rattner et al.

(10) Patent No.: US 11,270,363 B2
(45) Date of Patent: *Mar. 8, 2022

(54) SYSTEMS AND METHODS FOR PROVIDING AI-BASED COST ESTIMATES FOR SERVICES

(71) Applicant: Yembo, Inc., San Diego, CA (US)

(72) Inventors: Zachary Rattner, San Diego, CA (US); Siddharth Mohan, San Diego, CA (US); Vikram Gupta, San Diego, CA (US)

(73) Assignee: YEMBO, INC., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/096,429

(22) Filed: Nov. 12, 2020

(65) Prior Publication Data
US 2021/0065268 A1    Mar. 4, 2021

Related U.S. Application Data

(63) Continuation of application No. 16/374,449, filed on Apr. 3, 2019, now Pat. No. 10,867,328, which is a
(Continued)

(51) Int. Cl.
G06Q 30/06      (2012.01)
G06N 20/00     (2019.01)
G06Q 10/08     (2012.01)

(52) U.S. Cl.
CPC ......... *G06Q 30/0611* (2013.01); *G06N 20/00* (2019.01); *G06Q 10/0875* (2013.01)

(58) Field of Classification Search
CPC .......... G06Q 30/0283; G06Q 10/0875; G06Q 10/06311; G06Q 10/0834; G06Q 30/0206; G06N 20/00
See application file for complete search history.

(56) References Cited

U.S. PATENT DOCUMENTS 5,189,606 A    2/1993   Burns et al.
5,697,001 A   12/1997   Ring et al.
(Continued)

FOREIGN PATENT DOCUMENTS

KR    20170135260 A    12/2017
WO    2017/191525 A2   11/2017

OTHER PUBLICATIONS

Patent Cooperation Treaty, International Search Report for PCT/IB2017/052324, dated Jun. 29, 2018, pp. 1-2.
(Continued)

*Primary Examiner* — Scott L Jarrett
(74) *Attorney, Agent, or Firm* — Pillsbury Winthrop Shaw Pittman LLP

(57) ABSTRACT

Systems and methods for providing AI-based relocation cost estimates for services and products are disclosed. The method may comprise receiving description data of a location, the description data generated via at least one or more of a camera, a user interface, and/or one or more environment sensors. The method may generate an inventory list comprising a plurality of items, utilizing the machine learning model, based on the description data, the inventory list further comprising inventory attributes associated with the plurality of items related to a context of the plurality of items in the location. The method may generate, utilizing the machine learning models, one or more interactive quotes for relocation cost estimates comprising at least one or more offers for products and/or services based on the plurality of items in the inventory list and the inventory attributes.

16 Claims, 16 Drawing Sheets

Related U.S. Application Data continuation-in-part of application No. 15/494,423, filed on Apr. 21, 2017, now Pat. No. 10,528,962.

(60) Provisional application No. 62/654,163, filed on Apr. 6, 2018, provisional application No. 62/331,107, filed on May 3, 2016.

(56) References Cited

U.S. PATENT DOCUMENTS

| | | | |
|---|---|---|---|
| 5,761,674 | A | 6/1998 | Ito |
| 5,893,082 | A | 4/1999 | McCormick |
| 5,918,219 | A | 6/1999 | Isherwood |
| 6,446,053 | B1 | 9/2002 | Elliott |
| 6,851,611 | B1 | 2/2005 | Shaw-Sinclair |
| 6,996,503 | B2 | 2/2006 | Jung |
| 7,415,435 | B1 | 8/2008 | Weiss et al. |
| 7,447,337 | B2 | 11/2008 | Zhang et al. |
| 7,487,111 | B2 | 2/2009 | Shoen et al. |
| 7,551,849 | B1 | 6/2009 | Abad |
| 7,620,575 | B1 | 11/2009 | Tenorio |
| 7,783,523 | B2 | 8/2010 | Lopez et al. |
| 7,899,823 | B1 | 3/2011 | Trandal et al. |
| 7,941,330 | B1 | 5/2011 | Buentello et al. |
| 8,065,123 | B2 | 11/2011 | Wood |
| 8,219,558 | B1 | 7/2012 | Trandal et al. |
| 8,244,608 | B2 | 8/2012 | Wood |
| 8,615,450 | B1 | 12/2013 | Fanelli |
| 8,700,537 | B1 | 4/2014 | Deshpande et al. |
| 8,731,234 | B1 | 5/2014 | Ciarcia et al. |
| 8,774,471 | B1 | 7/2014 | Laaser et al. |
| 9,092,753 | B1 | 7/2015 | Fanelli |
| 9,171,059 | B2 | 10/2015 | Wood |
| 9,280,793 | B2 | 3/2016 | English et al. |
| 9,519,659 | B2 | 12/2016 | Jain et al. |
| 9,767,566 | B1 | 9/2017 | Paczkowski et al. |
| 9,785,835 | B2 | 10/2017 | Pelz et al. |
| 10,032,225 | B1 | 7/2018 | Fox et al. |
| 10,062,118 | B1 | 8/2018 | Bernstein et al. |
| 10,157,405 | B1 | 12/2018 | Hopkins |
| 10,210,577 | B1 | 2/2019 | Davis et al. |
| 10,223,750 | B1 | 3/2019 | Loo et al. |
| 10,311,521 | B1 | 6/2019 | Capone et al. |
| 10,311,529 | B1 | 6/2019 | Noel et al. |
| 10,332,138 | B1 | 6/2019 | Bruce et al. |
| 10,346,924 | B1 | 7/2019 | Engelhorn et al. |
| 10,354,232 | B2 | 7/2019 | Tomlin et al. |
| 10,467,700 | B1 | 11/2019 | Loo et al. |
| 10,521,865 | B1 | 12/2019 | Spader et al. |
| 10,528,962 | B2 * | 1/2020 | Rattner .............. G06Q 30/0206 |
| 10,657,490 | B2 | 5/2020 | Lekas |
| 10,672,080 | B1 | 6/2020 | Maurer et al. |
| 10,867,328 | B2 * | 12/2020 | Rattner .............. G06Q 30/0611 |
| 10,885,589 | B2 | 1/2021 | Sauer et al. |
| 11,037,245 | B1 | 6/2021 | Krieter et al. |
| 2001/0037190 | A1 | 11/2001 | Jung |
| 2001/0047250 | A1 | 11/2001 | Schuller et al. |
| 2002/0035522 | A1 | 3/2002 | Pilcher |
| 2002/0099725 | A1 | 7/2002 | Gordon |
| 2002/0107661 | A1 | 8/2002 | Ainlay et al. |
| 2002/0159627 | A1 | 10/2002 | Schneiderman et al. |
| 2003/0028393 | A1 | 2/2003 | Coulston et al. |
| 2004/0006521 | A1 | 1/2004 | Diamant et al. |
| 2004/0054568 | A1 | 3/2004 | Bradley et al. |
| 2004/0122748 | A1 | 6/2004 | Donald |
| 2004/0193474 | A1 | 9/2004 | Digiacomo |
| 2005/0060236 | A1 | 3/2005 | Lulo |
| 2005/0081161 | A1 | 4/2005 | MacInnes et al. |
| 2005/0233767 | A1 | 10/2005 | Ayyeppen et al. |
| 2006/0004598 | A1 | 1/2006 | Boyd et al. |
| 2006/0015413 | A1 | 1/2006 | Giovannoli |
| 2006/0098729 | A1 | 5/2006 | Shen |
| 2006/0161462 | A1 | 7/2006 | Sharma |
| 2006/0178902 | A1 | 8/2006 | Vicars et al. |
| 2007/0143123 | A1 | 6/2007 | Goldberg et al. |
| 2008/0082292 | A1 | 4/2008 | Storm |
| 2008/0177581 | A1 | 7/2008 | Artinger |
| 2008/0255914 | A1 | 10/2008 | Oren |
| 2008/0262789 | A1 | 10/2008 | Pershing et al. |
| 2009/0132436 | A1 | 5/2009 | Pershing et al. |
| 2009/0174768 | A1 | 7/2009 | Blackburn et al. |
| 2009/0198539 | A1 | 8/2009 | Buzz |
| 2009/0259565 | A1 | 10/2009 | Avisror et al. |
| 2009/0265193 | A1 | 10/2009 | Collins et al. |
| 2010/0174564 | A1 | 7/2010 | Stender et al. |
| 2010/0211421 | A1 | 8/2010 | Sciammarella et al. |
| 2011/0082782 | A1 | 4/2011 | Komac et al. |
| 2012/0016773 | A1 | 1/2012 | Strauss |
| 2012/0231424 | A1 | 9/2012 | Calman et al. |
| 2013/0132295 | A1 | 5/2013 | Horowitz et al. |
| 2013/0151298 | A1 | 6/2013 | Davis |
| 2013/0191183 | A1 | 7/2013 | Kite et al. |
| 2013/0290033 | A1 | 10/2013 | Reeser et al. |
| 2013/0317860 | A1 | 11/2013 | Schumann, Jr. |
| 2014/0140610 | A1 | 5/2014 | Tu et al. |
| 2014/0214473 | A1 | 7/2014 | Gentile et al. |
| 2014/0222608 | A1 | 8/2014 | Cohen et al. |
| 2014/0278809 | A1 | 9/2014 | Ekman |
| 2014/0279167 | A1 | 9/2014 | Miller et al. |
| 2014/0297468 | A1 | 10/2014 | Patterson |
| 2015/0186953 | A1 | 7/2015 | Gross |
| 2015/0310556 | A1 | 10/2015 | Kiper et al. |
| 2015/0324924 | A1 | 11/2015 | Wilson et al. |
| 2015/0371305 | A1 | 12/2015 | Ganapathy |
| 2015/0379430 | A1 | 12/2015 | Dirac et al. |
| 2016/0048934 | A1 | 2/2016 | Gross |
| 2016/0055506 | A1 | 2/2016 | Tama, Jr. et al. |
| 2016/0086231 | A1 | 3/2016 | Darey |
| 2016/0092959 | A1 | 3/2016 | Gross |
| 2016/0292761 | A1 | 10/2016 | Saric |
| 2017/0024685 | A1 | 1/2017 | Disorbo |
| 2017/0270612 | A1 | 9/2017 | Howe et al. |
| 2017/0293894 | A1 | 10/2017 | Taliwal et al. |
| 2017/0323319 | A1 | 11/2017 | Rattner et al. |
| 2018/0075550 | A1 | 3/2018 | Thornberry et al. |
| 2019/0244267 | A1 | 8/2019 | Rattner et al. |
| 2020/0134734 | A1 | 4/2020 | Aneesh |
| 2020/0151749 | A1 | 5/2020 | Rattner et al. |

OTHER PUBLICATIONS

Patent Cooperation Treaty, International Preliminary Report on Patentability for PCT/IB2017/052324, dated Nov. 15, 2018, pp. 1-6.

Fischer, Evan, Handy Man DIY Practically Renovates for You Pocketfullofapps.com, Jun. 19, 2012 (Year: 2012).

Redbeacon.com web pages Redbeacon, May 2012, Retrieved from Archive.org Jan. 6, 2015 (Year: 2012).

Crook, Jordan, Redbeacon Home Services Marketplace Launches Android App, Refocuses on Mobile Techcrunch.com, Oct. 22, 2012 (Year: 2012).

European Office Patent Office, Office Action issued in EP Patent Application No. 19167503.2, dated Jul. 16, 2020, pp. 1-11.

Graphisoft Inc., Graphisoft Constructor 2005 Tutorial, 2005, pp. 1-52.

Eaton, Kit, "Guiding D.I.Y. Home Repairs, or Summoning the Pros", The New York Times, Nov. 26, 2012, pp. 1-2.

Rao, Leena, Home Services Marketplace Redbeacon Launches iPhone App to Get Quotes on The go, International CES, 2015, pp. 1-2.

HomeTechOnline, Hometechonline.com, Retrieved from Archive. org, Feb. 2007, pp. 1-84.

European Office Patent Office, Office Action issued in EP Patent Application No. 17792566.6, dated May 11, 2021, pp. 1-9.

Xu et al., "Data-driven shape analysis and processing", Computer Graphics Forum, Feb. 2015, pp. 1-27, XP055797933, 2 Penn Plaza, Suite 701, New York, NY 10121-0701 USA.

Ranft et al., "The Role of Machine Vision for Intelligent Vehicles", IEEE Transactions on Intelligent Vehicles, Mar. 2016, pp. 8-19, vol. 1(1), XP011617378.

United States Patent and Trademark Office, Notice of Allowance issued in U.S. Appl. No. 16/730,491, filed Jan. 20, 2022, Form PTO-892, pp.

(56) References Cited

OTHER PUBLICATIONS

Girshick, "Fast R-CNN", Microsoft Research, Sep. 2015, pp. 1-9.
Girshick et al., "Rich feature hierarchies for accurate object detection and semantic segmentation", Tech report (v5), Computer Vision and Pattern Recognition, Oct. 2014, pp. 1-21.
Long et al., "Fully Convolutional Networks for Semantic Segmentation", Computer Vision and Pattern Recognition, Mar. 8, 2015, pp. 1-10.
Wierema, "Build your own Siri: Api.ai offers voice integration for all", TheNextWeb.com, Sep. 16, 2014, pp. 1-4.

\* cited by examiner

SYSTEMS AND METHODS FOR PROVIDING AI-BASED COST ESTIMATES FOR SERVICES

RELATED APPLICATIONS

This application is a continuation of U.S. Continuation-in-Part patent application Ser. No. 16/374,449, filed Apr. 3, 2019, which claims priority to U.S. patent application Ser. No. 15/494,423, filed Apr. 21, 2017, now U.S. Pat. No. 10,528,962, issued Jan. 7, 2020, which claims priority to U.S. Provisional Patent Application No. 62/331,107, filed May 3, 2016. U.S. patent application Ser. No. 16/374,449 also claims priority to U.S. Provisional Patent Application No. 62/654,163, filed Apr. 6, 2018. The subject matter of each of these applications are incorporated herein by reference in their entirety.

FIELD OF THE DISCLOSURE

This disclosure relates to systems and methods for providing artificial intelligence (AI)-based cost estimates for services.

BACKGROUND

Conventional systems and methods for providing cost estimates for services are lacking. The way estimates are done today are either inaccurate (phone calls/web forms) or very expensive to administer (in-person estimates). There are also some estimating solutions that are essentially video calls (one may think of them like a skinned Facetime or Skype app), but these solutions still require synchronous estimator interactions to administer and thus may be expensive and inconvenient to the consumer.

SUMMARY

One aspect of the disclosure relates to a system configured for providing artificial intelligence-based cost estimates for services. The system may comprise one or more hardware processors configured by machine-readable instructions to perform various functions. The functions may comprise receiving, at one or more processors, data from a scanning of a location, the scanning performed by one or more of a camera, a computer vision device, an inertial measurement unit, or a depth sensor. Data may be received, at one or more processors, related to the identification of one or more key elements at the location. An itemized statement and quote of work to be performed may be generated at one or more processors. The process to generate the itemized statement can be initiated by the consumer at their convenience in an asynchronous manner without the need to book appointments and/or wait for a service provider.

Another aspect of the disclosure relates to a method for providing artificial intelligence-based cost estimates for services. The method may comprise receiving, at one or more processors, data from a scanning of a location, the scanning performed by one or more of a camera, a computer vision device, an inertial measurement unit, or a depth sensor. Data may be received, at one or more processors, related to the identification of one or more key elements at the location. An itemized statement and quote of work to be performed may be generated at one or more processors. The artificial intelligence based itemized statement is faster, consistent, and visually more appealing with respect to an itemized statement generated by a human, for example.

Another aspect of the disclosure relates to system configured for providing interactive quotes for relocation cost estimates utilizing a machine learning model. The system comprises one or more hardware processors configured by machine-readable instructions to perform various operations. The operations may include receiving description data of a location. The description data may be generated via one or more of a camera, a user interface, and/or one or more environment sensors. The operations may include generating an inventory list comprising a plurality of items, utilizing the machine learning model, based on the description data. The inventory list may further comprise inventory attributes associated with the plurality of items related to a context of the plurality of items in the location. The operations may include generating, utilizing the machine learning models, one or more interactive quotes for relocation cost estimates comprising at least one or more offers for products and/or services based on the plurality of items in the inventory list and the inventory attributes.

In some implementations, the description data comprises one or more media types. The media types may comprise at least one or more of video data, image data, audio data, text data, user interface/display data, and/or sensor data. In some implementations, receiving description data comprises receiving sensor data from the one or more environment sensors. The one or more environment sensors comprise at least one of a GPS, an accelerometer, a gyroscope, a barometer, a microphone, and/or other physical environment sensors.

In some implementations, generating the inventory list comprises determining the one or more inventory attributes. The inventory attributes may comprise one or more of establishment attributes indicating at least physical dimensions of a building and/or a structure corresponding to the location, location attributes indicating a location of the item within the building and/or the structure, attributes of a set of objects indicating shared attributes of a set of items of the inventory list, attributes of an object indicating attributes of a specific item of the inventory list, and/or media attributes indicating attributes that apply to items within the scope of the one or more media types.

In some implementations, receiving description data comprises receiving user demographic data. The user demographic data may comprise physical characteristics of a user, socioeconomic information of the user, and/or geolocation information of the user.

In some implementations, sensor data is captured by a mobile computing device associated with a user and transmitted to the one or more processors at predetermined intervals with or without user interaction.

In some implementations, the one or more hardware processors configured by machine-readable instructions are configured such that generating the one or more interactive quotes utilizing the machine learning models comprises causing an artificial intelligence algorithm and/or one or more machine learning models to determine the one or more interactive quotes using at least one or more of the inventory list, the inventory attributes, and/or user demographic data as inputs for the artificial intelligence algorithm and/or the one or more machine learning models.

In some implementations, the interactive quotes comprise one or more of a relocation cost estimate, and add-on relocation services and/or products comprising at least one or more of packing/unpacking services, dismantling/assembling, junk removal, donations, reseller marketplaces, packaging material, insurance/maintenance contracts on service.

In some implementations, the one or more processors are configured to adjust a relocation cost estimate based on at least one or more of physical attributes of the plurality of items in the inventory list including fragile items, and/or small items, determined based on the inventory attributes, and physical attributes of the location including accessibility, distance from main road, and/or presence of elevators or stairs.

In some implementations, the one or more processors are further configured to adjust the relocation cost estimate based on at least one or more of historical and/or projected data for weather, road conditions, and demand for service.

In some implementations, the one or more processors are further configured to determine a user directive based on a user input, the one or more inventory attributes, and/or the plurality of items in the inventory list. The user directive may comprise an indication to change the descriptive data determined based on the user's location, a camera angle used to record images of the objects, and/or other example information; change the descriptive data based on the user directive; and/or determine an adjusted interactive quote based on the change in the descriptive data.

Another aspect of the disclosure related to a method for providing interactive quotes for relocation cost estimates utilizing a machine learning model. The method is performed by one or more hardware processors configured by machine-readable instructions. The method comprises: receiving, at one or more hardware processors, description data of a location, the description data generated via at least one or more of a camera, a user interface, and/or one or more environment sensors; generating, at one or more hardware processors, an inventory list comprising a plurality of items, utilizing the machine learning model, based on the description data, the inventory list further comprising inventory attributes associated with the plurality of items related to a context of the plurality of items in the location; and generating, at one or more processors, utilizing the machine learning models, one or more interactive quotes for relocation cost estimates comprising at least one or more offers for products and/or services based on the plurality of items in the inventory list and the inventory attributes.

In some implementations, the description data comprises one or more media types. The media types comprise at least one or more of video data, image data, audio data, text data, user interface/display data, and/or sensor data. Receiving description data comprises receiving sensor data from the one or more environment sensors. The one or more environment sensors comprise at least one of a GPS, an accelerometer, a gyroscope, a barometer, a microphone, and/or other physical environment sensors.

In some implementations, generating the inventory list comprises determining the one or more inventory attributes. The inventory attributes comprise one or more of establishment attributes indicating at least physical dimensions of a building and/or a structure corresponding to the location, location attributes indicating a location of the item within the building and/or the structure, attributes of a set of objects indicating shared attributes of a set of items of the inventory list, attributes of an object indicating attributes of a specific item of the inventory list, and/or media attributes indicating attributes that apply to items within the scope of the one or more media types.

In some implementations, receiving description data comprises receiving user demographic data. The user demographic data comprises physical characteristics of a user, socioeconomic information of the user, and/or geolocation information of the user.

In some implementations, sensor data is captured by a mobile computing device associated with a user and transmitted to the one or more processors at predetermined intervals with or without user interaction.

In some implementations, the one or more hardware processors configured by machine-readable instructions are configured such that generating the one or more interactive quotes utilizing the machine learning models comprises causing an artificial intelligence algorithm and/or one or more machine learning models to determine the one or more interactive quotes using at least one or more of the inventory list, the inventory attributes, and/or user demographic data as inputs for the artificial intelligence algorithm and/or the one or more machine learning models.

In some implementations, the interactive quotes comprise one or more of a relocation cost estimate, and add-on relocation services and/or products comprising at least one or more of packing/unpacking services, dismantling/assembling, junk removal, donations, reseller marketplaces, packaging material, insurance/maintenance contracts on service.

In some implementations, the one or more processors are configured to adjust a relocation cost estimate based on at least one or more of physical attributes of the plurality of items in the inventory list including fragile items, and/or small items, determined based on the inventory attributes, and physical attributes of the location including accessibility, distance from main road, and/or presence of elevators or stairs.

In some implementations, the one or more processors are further configured to adjust the relocation cost estimate based on at least one or more of historical and/or projected data for weather, road conditions, and demand for service.

In some implementations, the one or more processors are further configured to determine a user directive based on the user input, the one or more inventory attributes, and/or the plurality of items in the inventory list; wherein the user directive comprises an indication to change the descriptive data determined based on the user's location and camera angle change the descriptive data based on the user directive; and determine an adjusted interactive quote based on the change in the descriptive data.

DETAILED DESCRIPTION

Figure 1:
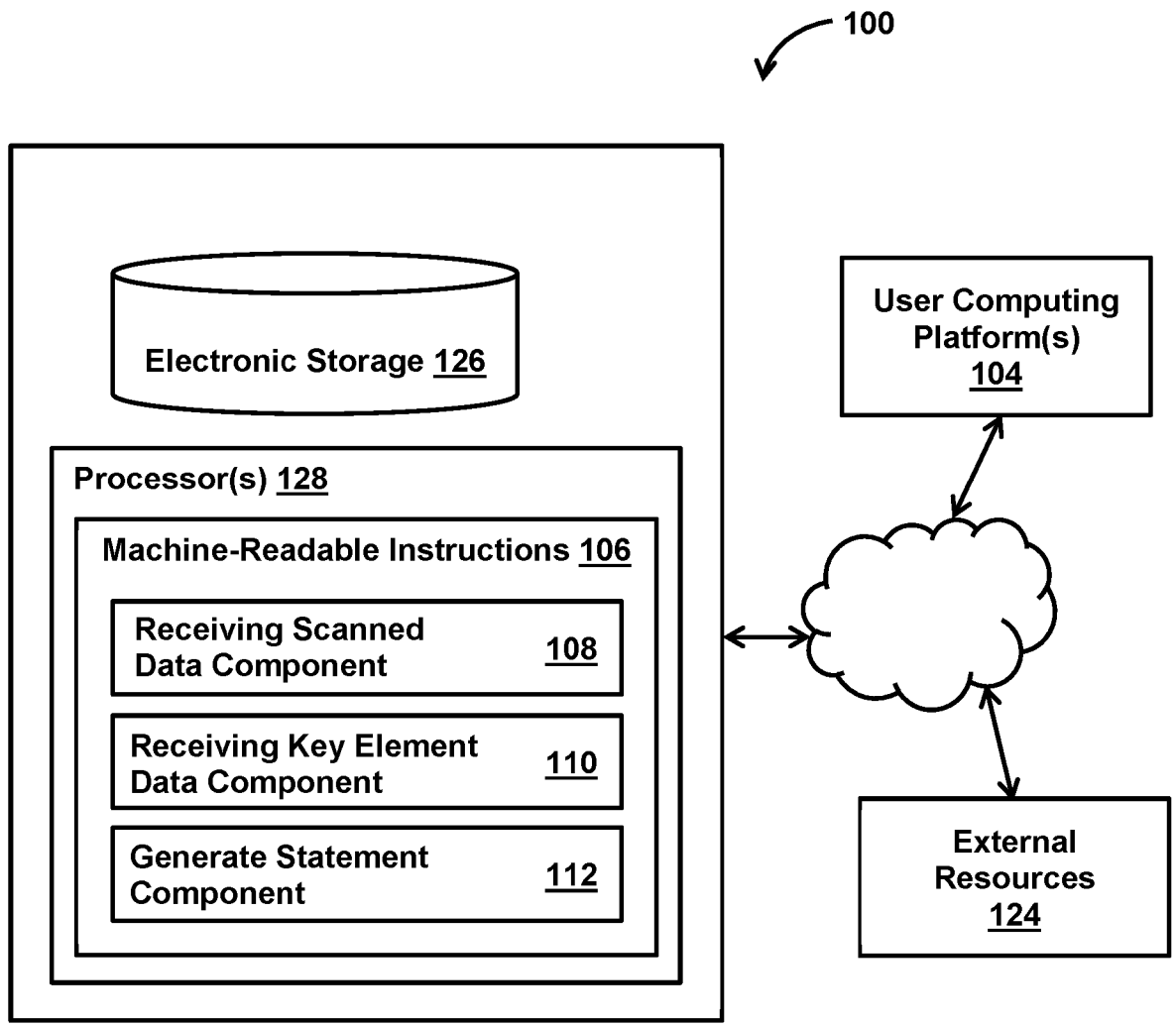
FIG. 1 illustrates a system for providing AI-based cost estimates for services, in accordance with one or more implementations.

Some implementations according to the present technology provide a novel way of providing upfront, accurate cost/price estimates by using a deep learning/natural language processing (e.g., artificial intelligence (AI)) powered system and/or other machine learning models. The present technology may make home services price estimates into a more interactive experience. Consumers may add and remove services like moving/packing specific items. This may be similar to how one may add and remove products to an online shopping cart, for example.

Some implementations according to the present technology may provide offers and/or services unrelated to the home services but related to the consumer. The interactive experience may also prompt the consumer to provide input that will improve the estimate, and services and products.

Some implementations according to the present technology may provide the ability to perform targeted actions based on items discovered by AI. One example may relate to moving. If, for example, a bed is discovered, a specific targeted action may be asking the consumer if disassembly is needed. A suggestion to provide upselling services (e.g., packing etc.) if a kitchen cabinet is detected with the actual cost being quoted.

Some implementations according to the present technology may include the ability to ask targeted questions automatically based on images sent. Consider moving as an example. The system may ask if a wall unit is bolted to the ground once detected and use the consumer's answer to update a quote.

In some implementations, the ability for consumers to correct and/or update quotes may be provided. For example, if a bed was incorrectly detected as a sofa, consumers may interactively change the item name, and have it reflected in the cost. If the AI detects an item that the consumer wants to exclude from the quote (may be they plan on moving it themselves), they may remove the item and the quote may update in real-time or near real-time.

Analysis from AI may be used to predict the cost of a service (e.g., detecting number of items (e.g., objects), size and weight of items (objects), a location of items (objects), etc., and translating this into cost). Home service providers may further augment information sent by consumers to update a quote. The ability to automatically send targeted pictures from data sent by consumers as part of the quote, either in a web form or in a pdf, may be provided. This feature may be referred to as "visual quote." The ability to sell affiliate services (e.g., home insurance etc.) based on the inventory of items detected may be provided, in some implementations. The inventory of items may include information in addition to a list of objects. The inventory of items may include information related to a type of media used to record and/or input an item/object into the system (e.g., images, video, voice recording, etc.), attributes of a given item/object (e.g., as described herein), a location of the given item/object, whether the given item/object belongs to a set of related items/objects, and/or other information.

FIG. 1 illustrates a system configured for facilitating AI-based cost estimates for services, in accordance with one or more implementations. In some implementations, system 100 may include one or more server 102. The server(s) 102 may be configured to communicate with one or more user computing platforms 104 according to a client/server architecture. The users may access system 100 via user computing platform(s) 104.

Digital media items may include one or more of digital photos, images, videos, audio, and/or other digital media items. Local digital media items may include digital media items stored locally at a given user computing platform 104. Connected digital media items may include digital media items stored remotely from a given user computing platform 104 such as at other user computing platforms 104, at other locations within system 100, and/or locations outside of system 100. Connected digital media items may be stored in the cloud.

The server(s) 102 and/or computing platform(s) 104 may be configured to execute machine-readable instructions 106. The machine-readable instructions 106 may include one or more of a receiving scanned data component 108, a receiving key element data component 110, a generate statement component 112 and/or other components. In some implementations, some or all of the components may be located in computing platform(s) 104. The AI work may be performed in one or more of the cloud, a mobile device, and/or other devices. The receiving scanned data component 108 may be configured to receive, at one or more hardware processors, data from a scanning of a location, the scanning performed by one or more of a camera, a computer vision device, an inertial measurement unit, a depth sensor, and/or other scanners. In some implementations, scanning includes data generated by video and/or image acquisition devices, and/or voice recording devices, a user interface, and/or any combination thereof. The data may be generated responsive to a user request, and/or automatically by the system (e.g., without initiation by a user).

The receiving key element data component 110 may be configured to receive, at one or more hardware processors, data related to the identification of one or more key elements at the location. The generate statement component 112 may be configured to generate, at one or more processors, an itemized statement and quote of work to be performed. Various other components are contemplated. For example, a launch indication component may be configured to receive, at one or more hardware processors, an indication of a launch of an app or other messaging channel.

In keeping with some implementations according to the present disclosure, estimating the cost for home painting may be a function of predicting the amount of material needed and/or the duration to complete the job. Generating cost estimates automatically through algorithms may be desirable since most painting companies currently require their employees to physically inspect the paint site before the job, which increases the cost of the painting service or to reduce the time it takes for on-site estimators to provide the cost estimate.

To estimate the amount of material needed and/or the work duration, several factors may need to be considered including the surface area of the components to paint, and/or other factors. Other factors may include one or more of surface type, surface texture, surface material, preparation work, blemishes, cleanup work, and/or other factors.

Surface type may include wall, baseboard, trim, ceiling, door, and/or other surface types. Paint type may be determined based on the surface type (e.g., high gloss white for trim, eggshell for walls, flat white for ceiling).

Surface texture and/or surface/material may include flat, textured, and/or other surface texture and/or surface/material. Surface texture and/or surface/material may determine how many coats of paint may be needed. Preparation work may include repairing blemishes such as old paint colors, ding/dents, scratches, marks, and/or other blemishes.

Other factors may include determining if primer, patching, sanding, caulking, and/or sealing may be needed. Other preparation work may include moving furniture, décor, and/or other items. Further preparation work may further include covering carpets, furniture, home wares, and/or other items. Still further preparation work may include removing, replacing, and/or covering electrical face plates and/or light switches. Other preparation work may include plant covering and/or protection. Other preparation work may include washing surfaces to be painted. Cleanup work may include disposing coverings, disposing leftover paint, and/or other cleanup work.

The present disclosure involves using computer vision using cameras and optional depth sensors on the smartphone and/or inertial measurement unit (IMU) data (e.g., data collected from an accelerometer, a gyroscope, a magnetometer, and/or other sensors) in addition to text data: questions asked by a human agent or an AI algorithm based on sent images, videos, and previous answers as well as answers by the consumer on a mobile device (e.g., smartphone, tablet, and/or other mobile device) to come up with an estimate of how much it will cost to perform a moving job, a paint job, and/or other services. These examples are not intended to be limiting.

In some implementations, a workflow may include a user launching an app or another messaging channel (SMS, MMS, Facebook Messenger, web browser, etc.) and scanning a location (e.g., a home and/or another location) where camera(s) data and/or sensor(s) data may be collected. The app may use the camera and/or IMU and optionally a depth sensor to collect and fuse data to detect surfaces to be painted, objects to be moved, etc. and estimate their surface area data, and/or move related data, in addition to answers to specific questions. An AI algorithm (or neural network etc.) specifically trained to identify key elements may be used (e.g., walls, ceiling, floor, furniture, wall hangings, appliances, and/or other objects). Other relevant characteristics may be detected including identification of light switch/electrical outlets that would need to be covered or replaced, furniture that would need to be moved, carpet/flooring that would need to be covered, and/or other relevant characteristics.

For an example related to painting, the user may optionally enter what brands of paint may be preferred for each area. Areas may include wall, trim, ceiling, baseboard, door, and/or other areas. The messaging channel may sell leads to paint suppliers to promote their products in relevant spaces. This may be optionally implemented as an automated advertising network where the bidding process may be started by an algorithm determining a category of product that would be useful to the consumer (e.g., high gloss trim paint), then auctioning off ad real estate to the highest bidder in the category (e.g., suggesting Dunn Edwards versus Sherwin Williams, for example).

In some implementations, a consumer app working along with a backend infrastructure may generate an itemized statement of work. For example, for one or more rooms, the system may give an estimated square footage on walls, trim, ceiling, baseboard, door, and/or other items (e.g., for a painting example); the system may give an estimated move time and/or move difficulty (e.g., for a moving related example), and or other information.

In some implementations, an AI algorithm may ask targeted questions based on images/videos sent by the user to perform further analysis. An AI improvement engine may give a dollar amount estimate for various rooms and/or locations. Itemized lists may include paint costs based on square footage and number of coats, setup costs based on time and/or work involved, cleanup costs based on type of work requested (e.g., for a painting related example); moving costs based on a quantity of items, a size and/or shape of the items, an amount of disassembly/assembly required, an accessibility of a building or house (e.g., for a moving related example), and/or other items.

Examples of setup costs, e.g., for a painting related example, may include but are not limited to: "Move sofa, coffee table, and love seat to center of room, cover with plastic" (could use furniture detector from moving AI component); identify if ladder may be needed based on wall height and/or whether ceilings may be included in the work estimate; and/or "Replace two damaged electrical outlet covers, tape over remaining three electrical outlet covers."

In some implementations, users may review itemized quotes and/or make changes if desired (e.g., painting trim may be too expensive, so they may choose to remove that item; they may decide they are going to move particular items themselves, etc.). Quotes may update in real-time or near real-time. Once a quote looks acceptable, user may book the painting and/or moving job (as just two examples) from the app. Users may manually select items that the estimation algorithm has not discovered (e.g., a wall the user wants painted that was missed by the technology, disassembly of any items that would help the moving process, and/or other items) or add corrections to any possible mistakes made by the algorithm (e.g., the wall detected also contains some surface area of the ceiling or floor, two refrigerators were detected when there is only one refrigerator in a house). Users may add and remove items from the itemized quote. Adding and/or removing items may be similar to adding and/or removing items in an online shopping cart.

In some implementations, the app along with the backend may analyze the light in the room, color and/or texture of other items in the room to suggest appropriate paint colors (e.g., in a painting related example); analyze a room shape and/or doorway size and recommend disassembly of various objects (e.g., in a moving related example); and/or perform other analysis. Quote information with relevant photos and/or videos extracted from the surveying process may be sent electronically to the painter's or the mover's (as just two examples) backend system for fulfillment.

In some implementations, estimating the cost for washing windows (e.g., as another practical example of an application for the present system) may be a function of how many, how large, and/or how accessible the windows are. This may be automated with algorithms.

In some implementations, parameters may be desired and/or required to give an accurate window washing quote including size of windows, number of windows, washing areas (e.g., inside, outside, and/or both), quality and/or condition of windows, accessibility (e.g., floor the windows may be on), outside impediments (e.g., trees, shrubs, HVAC units, and/or other impediments), type of wash required (e.g., hand squeegee, power wash, and/or other types of wash), and/or other parameters. As a problem prevention measure, notifying the user before scheduling a power wash may be desirable if the windows are detected to fit poorly. The present disclosure allows these parameters to be determined algorithmically so an accurate window washing quote may be given through an app.

In some implementations, a workflow may include the following. A user may launch an app or another messaging channel (SMS, MMS, Facebook Messenger, web browser, etc.) and walks around a one or more of a home, office, and/or another location. A computer vision/IMU techniques may be used similar to the painting solution where the windows may be detected, and their square footage may be estimated by AI algorithm. An AI algorithm (or deep neural nets etc.) may be trained to identify common impediments such as bushes, trees, HVAC units, patio furniture, and/or other items. The user may enter whether the quote may be for internal, external, or both. This information may be inferred using an AI algorithm (or deep neural nets) based on an analysis of the video itself (e.g., if half the video was shot indoors and half was taken outdoors, perhaps the user wants both). The user may enter the floor/number of stories that are desired to be washed. In some implementations, this may be inferred from the AI algorithm, GPS altimeter data, and/or IMU data. An AI algorithm may cause targeted questions to be asked based on images and/or videos sent by the user to perform further analysis. A user may enter the type of wash required. In some implementations, this may be accompanied by suggestions from the AI algorithm (e.g., if a lot of dirt/grime was detected on the windows, the app may suggest a power wash would be better). The app may work with a backend infrastructure and may generate an itemized quote(s) with line items for factors including a time estimate(s) based on number of windows, accessibility issues that could add delay/time to the work, type of wash requested, washing inside/outside/both, and/or other factors. A user may review an itemized quote(s) and/or makes changes if desired (e.g., adding inside may be too expensive, and changes should be made to the outside and not the inside). Once the quote looks good, user may book the window washing job from the app. Quote information with relevant photos and/or videos may be extracted from the surveying process may be sent electronically to the window washer's backend system for fulfillment.

Estimating for junk removal (as yet another example of an application of the present system) may be largely a volume estimation problem. Currently, junk removal companies require the customer to estimate themselves what proportion of a truck they need to remove their junk. This process may not be accurate since most customers are not experts at volume estimation, and may be commonly mitigated by sending human surveyors. It may be desirable from both a consumer and business provider standpoint to provide an automated way to obtain an accurate junk removal quote. The present disclosure describes one such way of doing so using computer vision techniques, artificial intelligence algorithms, and/or inertial measurement unit (IMU) data.

In some implementations, a workflow may include a user launching an app or another messaging channel (SMS, MMS, Facebook Messenger, web browser, etc.) and scanning junk they would like to have removed. The app may collect camera frames and IMU data to estimate the dimensions and volume of the material to be removed data in addition to answers to specific question. An AI algorithm (or deep neural network) trained for object identification may be used to estimate the dimensions and volume of the material to be removed and/or identify what the material and/or item may be (e.g., chair, sofa, paint, and/or other materials/items. An AI algorithm may instead directly estimate the total volume of all the items the consumer wants to remove without detecting individual items. An AI algorithm may ask targeted questions based on images and/or videos sent by the user to perform further analysis. The app working with a backend infrastructure may generate an itemized quote of the junk to be removed or may just generate the total volume or total cost. The cost associated with the junk removal may be calculated based on the volume of the junk and/or estimated time required to disassemble the junk. In some implementations, an external cloud server may provide time estimates for how long it takes to disassemble various items. The cloud server may perform logistic regression and/or other machine learning techniques to estimate disassembly time based on category, size, volume, and/or other factors. The cloud server may identify a blacklist of hazardous materials or any surcharge items (e.g., oil, batteries, fireworks, and/or other hazardous materials) and notify the customer that such items require special disposal techniques. If available, other relevant service companies able to perform the task may be recommended (e.g., the ad network approach as described above may be used to suggest a service provider).

In keeping with some implementations of the workflow, the user may review the itemized quote and makes necessary changes as desired. By way of non-limiting example, if the disassembly of the dining table adds too much cost, they may remove that line item and the price updates in real time. The AI Improvement engine allows the AI algorithm to learn from human corrections (user or another human reviewer). Once the quote looks good, user may book the junk removal job from the app or other messaging channels. Quote information with relevant photos and/or videos may be extracted from the surveying process and may be sent electronically to the junk remover's backend system for fulfillment.

Figure 2:
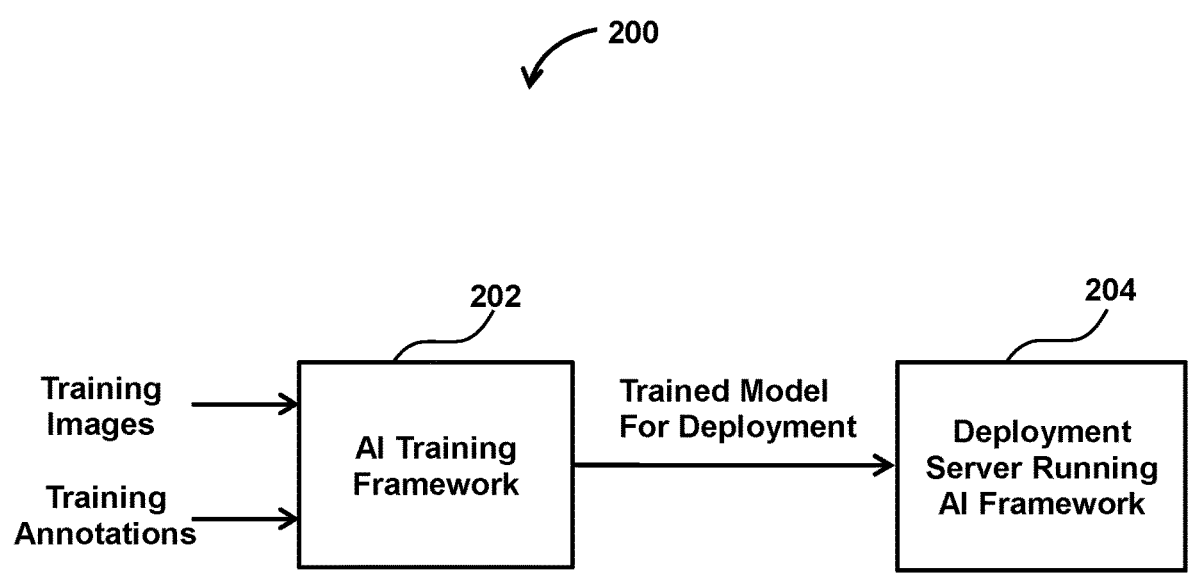
FIG. 2 illustrates an artificial intelligence (AI) model that may be trained to recognize objects/surfaces, in accordance with one or more implementations.

FIG. 2 illustrates an artificial intelligence (AI) model 200 that may be trained to recognize objects, in accordance with one or more implementations. Multiple training images with objects that need to be detected may be presented to the artificial intelligence (AI) framework 202 for training. Training images may contain non-objects such as walls, ceilings, carpets, floors, and/or other non-objects. Each of the training images may have annotations (e.g., location of objects of desire in the image, coordinates, and/or other annotations) and/or pixel wise classification for objects, walls, floors, and/or other training images. Responsive to training being complete, the trained model may be sent to a deployment server 204 running an AI framework. It should be noted that training data is not limited to images and may include different types of input such as audio input (e.g., voice, sounds, etc.), user entries and/or selections made via a user interface, scans and/or other input of textual information, and/or other training data. The AI algorithms may, based on such training, be configured to recognize voice commands and/or input, textual input, etc.

The deployment server 204 may be a standalone server and/or a module that may be deployed as part of an app in a user's smartphone, tablet, and/or other personal computing device, in accordance with one or more implementations.

Figure 3:
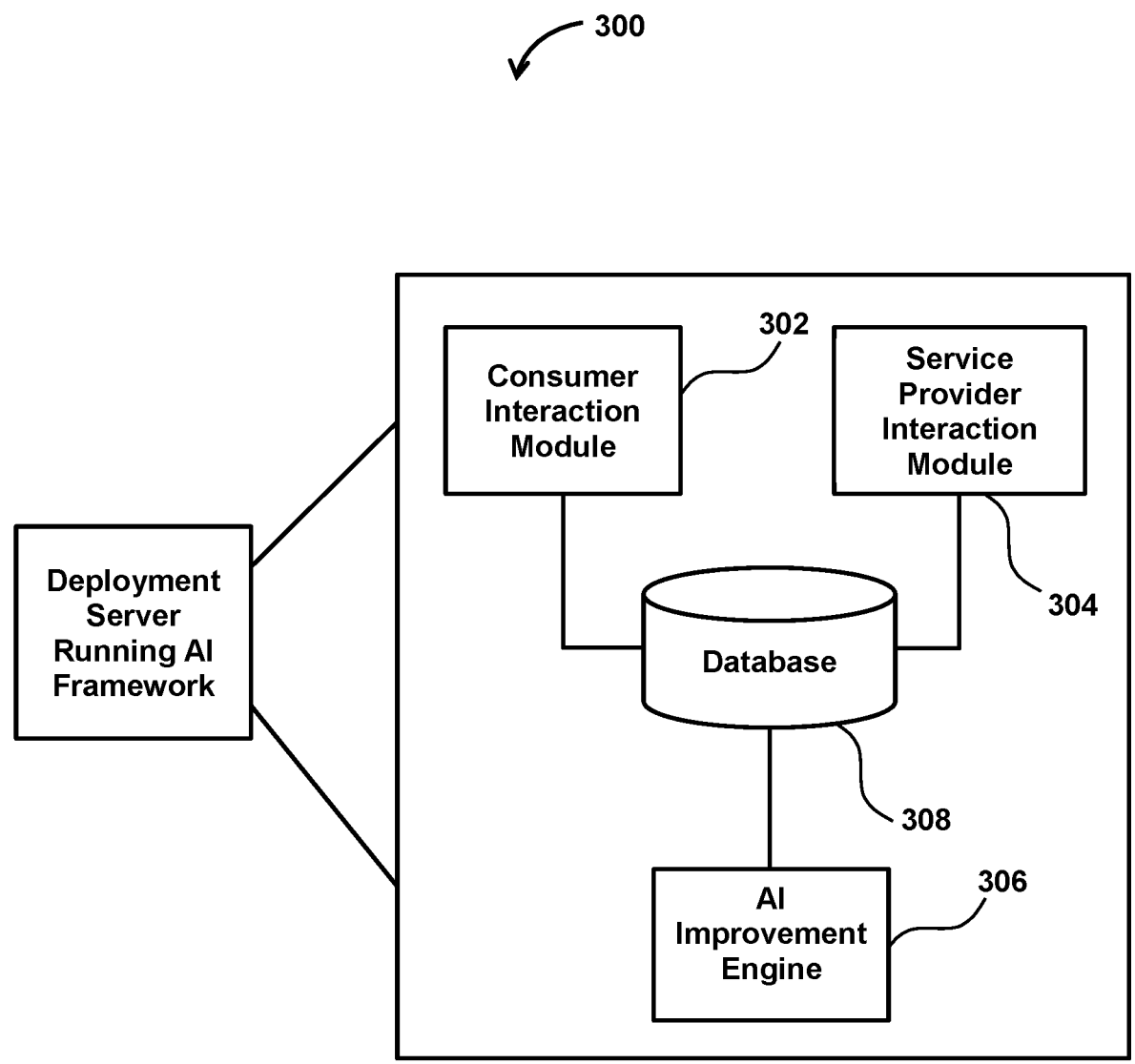
FIG. 3 illustrates an exemplary system wherein a deployment server running an AI framework may include a consumer interaction module, a service provider interaction module, a database, and an AI improvement engine. The AI improvement engine may run on one or more of machine learning algorithms, AI algorithms, and/or other algorithms, in accordance with one or more implementations.

FIG. 3 illustrates details of how a deployment server 300 running AI framework may be architected. It may include one or more of a consumer interaction module 302, a service provider interaction module 304, an AI improvement engine 306, a database 308, and/or other elements.

The consumer interaction module 302 may ingest data from a consumer, store the data in database 308, analyze the data with AI models for processing, and possibly communicating a quote back to a consumer. The consumer interaction module 302 may ingest one or more of text, video, pictures, audio, and/or other things from a user.

In some implementations, the service provider interaction module 304 may serve as an interface to allow service providers to review information from consumers and AI analysis, make corrections if needed, and communicate with a user. The provider interaction module 304 may have the capability for a service provider to review the quote, send it back to the user through the appropriate messaging channel, or export to pdf and send it via another channel.

The AI improvement engine 306 may combine the original analysis output from the AI with any changes made by a consumer, service provider, or dedicated human reviewer and provide feedback to the AI framework to improve the trained model. The AI improvement engine 306 may also host the AI framework which runs multiple machine learning models to be used on the data sent from the consumer as well as a service provider.

Figure 4:
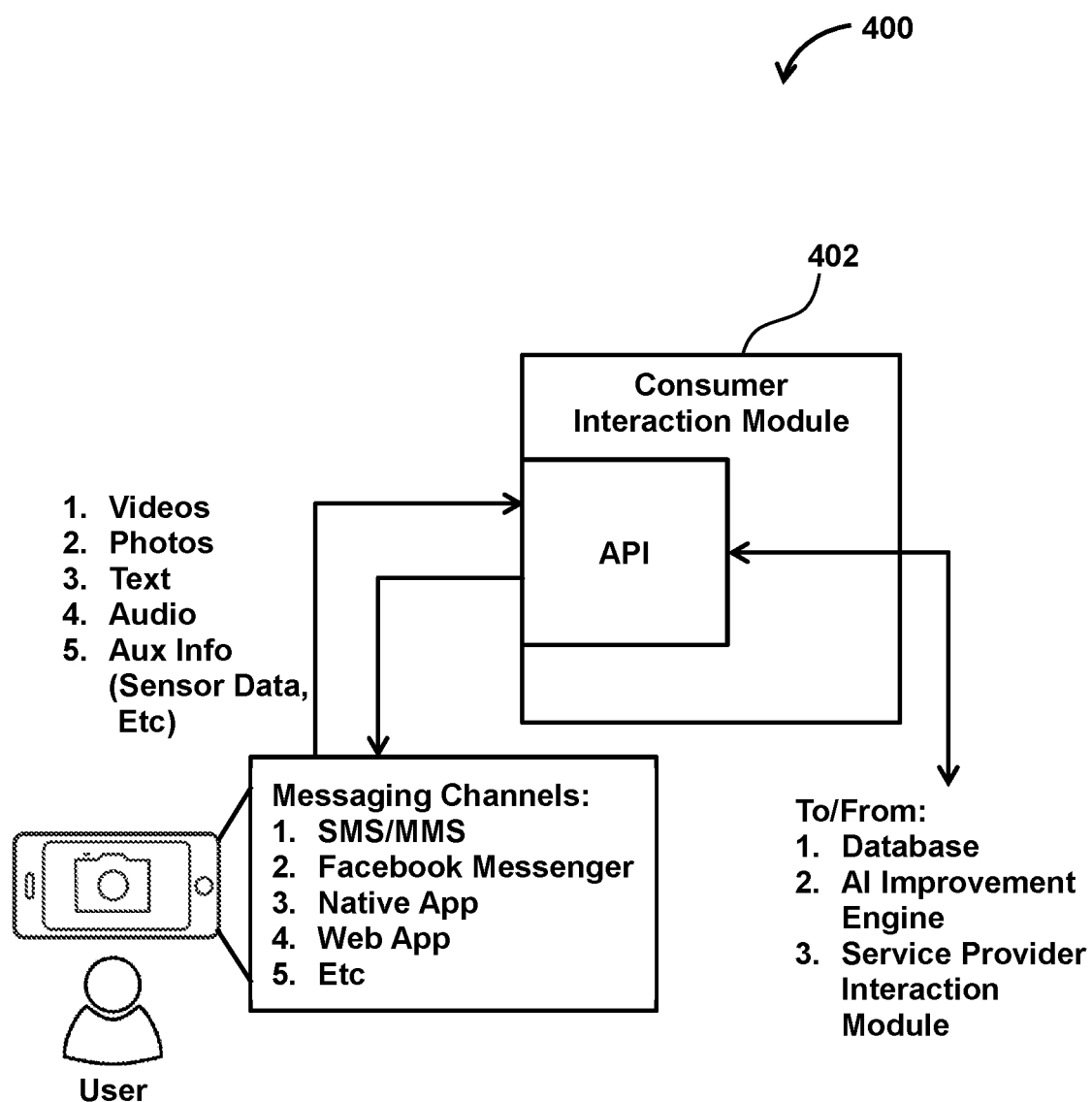
FIG. 4 illustrates an exemplary system wherein a user may send and receive information to/from a consumer interaction module in a deployment server running an AI framework, in accordance with one or more implementations.

FIG. 4 illustrates an exemplary system 400 wherein a user sends information to a consumer interaction module running on a deployment server 402. The user's app or another messaging channel (SMS, MMS, Facebook Messenger, web browser, etc.) may record camera frames, sensor (IMU) information, and/or other information including text data (answers to questions asked by a human agent or targeted questions asked by an AI algorithm based on data that was already sent). Objects may be tracked on the user's smartphone, tablet, and/or other personal computing device to send the relevant camera frames to the deployment server 402. The deployment server 402 may use the camera frames and detect objects in the camera frame. The deployment server 402 recognizes and finds size of object through other computer vision techniques leveraging the sensors (e.g., IMU). As output the deployment server 402 may generate lists of detected objects and/or detected non-objects as well as any size, dimension and weight information. The deployment server may reside on-device or the functionality may be split between an on-device server and a server in the cloud.

Figure 5:
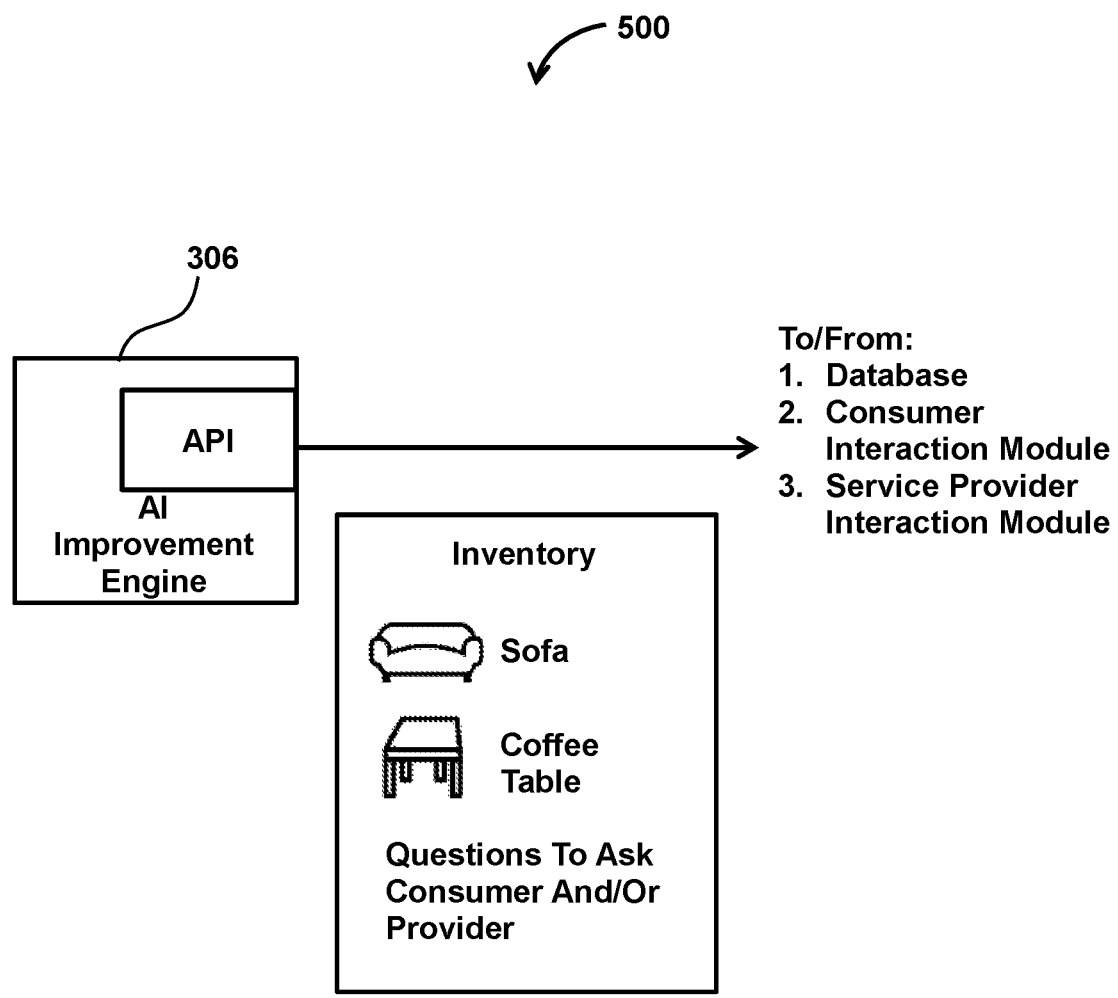
FIG. 5 illustrates an exemplary system wherein the AI improvement engine may output detected objects and other non-objects with various attributes (size, dimensions, locations, area, etc.) (and may create an inventory), as well as follow-up questions to ask of a consumer(s) and/or service provider(s), in accordance with one or more implementations.

FIG. 5 illustrates an exemplary system 500 wherein detected objects may create an inventory, size and/or weight information for objects that are detected as well as create a list of questions that the AI algorithm may need to provide a more accurate data to service provider or user (for example, questions on the pictures sent by the user or follow up questions based on past responses). This may be facilitated by a question answering component (not shown for purposes of clarity) which can reside in the AI improvement engine or the consumer interaction module. The inventory with the request for additional inputs may be sent to the user or to a service provider.

Figure 6A:
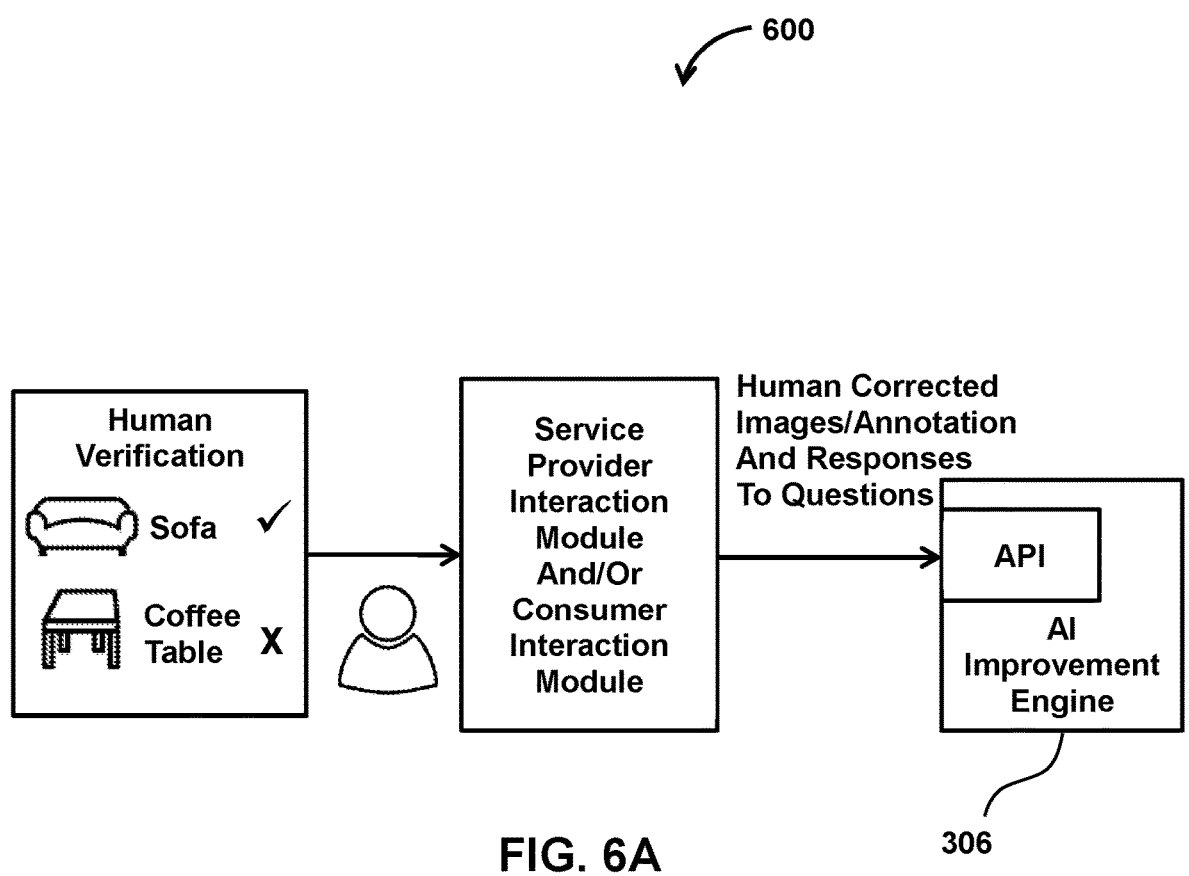
FIG. 6A illustrates an exemplary system where the output of the AI improvement engine is optionally human-verified and fed back into the AI improvement engine for better performance, in accordance with one or more implementations.

FIG. 6A shows a system 600 and how the inventory may be optionally human verified, in accordance with one or more implementations. During a human verification step, any mistakes by the detection algorithm may be corrected and/or the training framework may be updated with the updated images for training. The human verification may happen on end consumer devices where the user may correct the misdetections or in the cloud where a different human operator or service provider may issue the corrections. The human verification may include human corrected images, annotations, translations, interactive quote changes, added text, user interface inputs, and/or other information. The output may be an updated inventory. The inventory may additionally contain size or weight information for the objects that are detected. The corrections may be sent back to the AI algorithm for further processing.

Figure 6B:
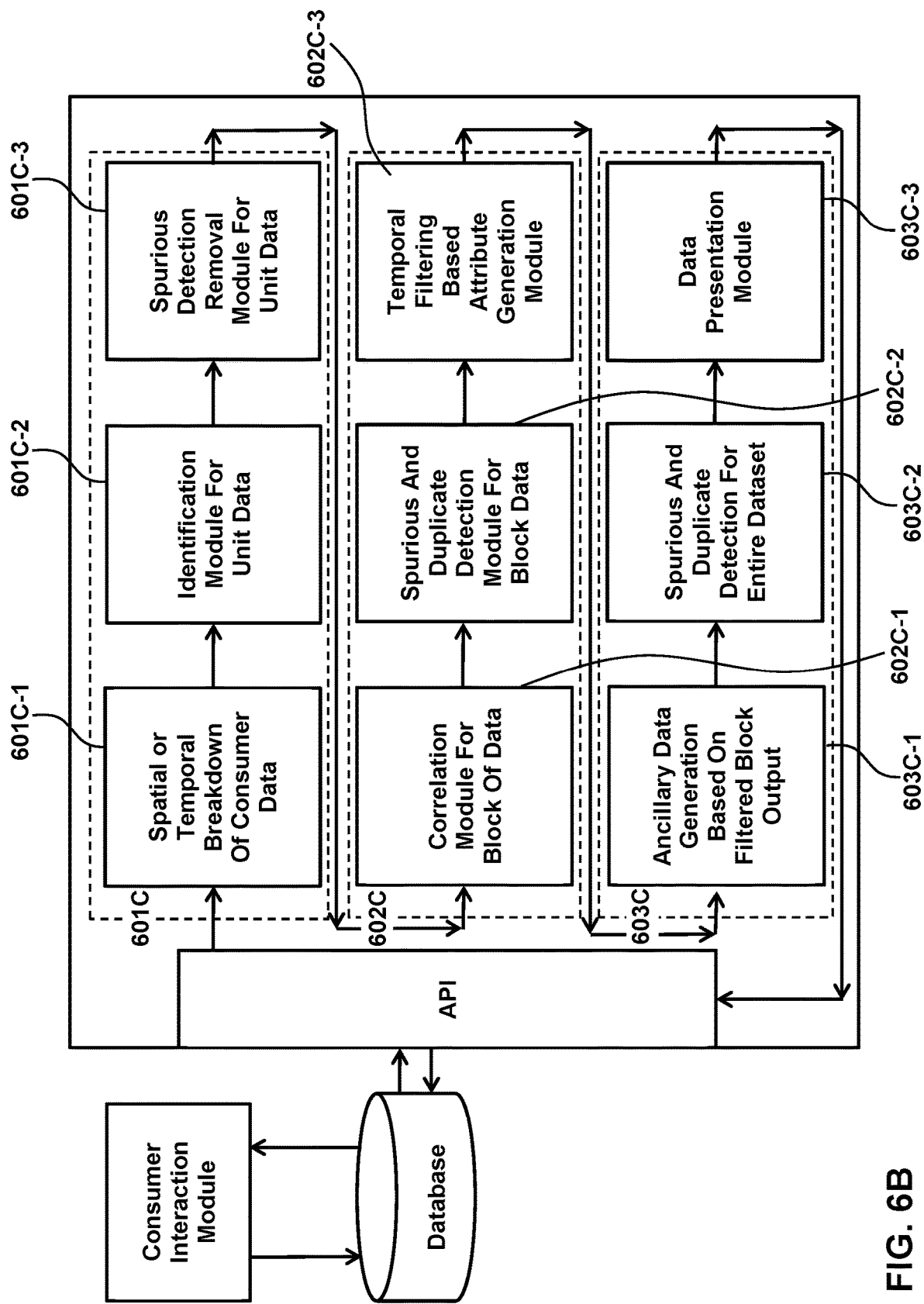
FIG. 6B illustrates an exemplary implementation of artificial intelligence (AI) algorithms, in accordance with one or more implementations.

FIG. 6B illustrates an exemplary implementation of artificial intelligence (AI) algorithms. The AI algorithms may include natural language processing algorithms, machine learning algorithms, neural networks, regression algorithms, and/or other artificial intelligence algorithms. The AI algorithms described related to FIG. 6B may be representative of the descriptions of AI given elsewhere in this disclosure. At an operation 601c-1, FIG. 6B illustrates how the data such as video or audio (e.g., provided by a user such as a consumer) is divided into smaller segments (units) using spatial, and/or temporal constraints as well as other data such as context data. For example, a video may be divided into multiple frames and poor quality images with low lighting and/or high blur may be filtered out. Similarly, an audio input may filter out segments comprising background noise and create units of audio where a speaker (e.g., the consumer) is actively communicating.

At an operation 601c-2 an AI algorithm such as a deep neural network comprising a convolutional neural network and/or a recurrent neural network is used to detect objects or areas of interest in individual units of the data provided by the user (e.g., consumer). For example, individual images in a video may be presented as an input to a convolutional neural network that performs detection for objects belonging to classes needed to generate an accurate itemized statement (e.g., as described herein). Other AI algorithms such as linear regression, etc. may also be used. Multiple different AI algorithms may be used to process one or more different inputs. As an example, besides object detection using a convolutional neural network, another different convolutional neural network may be used to classify a location of the user to be a type of a room such as a bedroom, kitchen, etc. As another example, the unit of data such as an image frame may be first processed by an AI algorithm, such as a Convolutional Neural network, and the output of this network may be further processed by another algorithm such as a Recurrent Neural Network. The output of these algorithms can be a 2D and/or 3D bounding box, and/or or a mask around the objects of interest, or, for audio data, a text string that processes and/translates the user voice input, etc. Similarly, the output of these networks can also include confidence values for the predictions, and the ordered set of classes that the detected object can be classified to.

As an example, a neural network (e.g., convolutional and/or recurrent) may be based on a large collection of neural units (or artificial neurons). The one or more neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In an embodiment, each individual neural unit may have a summation function that combines the values of all its inputs together. In an embodiment, each connection (or the neural unit itself) may have a threshold function such that a signal must surpass the threshold before it is allowed to propagate to other neural units. These neural network systems may be self-learning and trained, rather than explicitly programmed, and can perform significantly better in certain areas of problem solving, as compared to traditional computer programs. In an embodiment, the one or more neural networks may include multiple layers (e.g., where a signal path traverses from front layers to back layers). In an embodiment, back propagation techniques may be utilized by the neural networks, where forward stimulation is used to reset weights on the "front" neural units. In an embodiment, stimulation and inhibition for the one or more neural networks may be freer flowing, with connections interacting in a more chaotic and complex fashion. In an embodiment, the intermediate layers of the one or more neural networks include one or more convolutional layers, one or more recurrent layers, and/or other layers.

The one or more neural networks may be trained (i.e., whose parameters are determined) using a set of training data. The training data may include a set of training samples. Each sample may be a pair comprising an input object (typically a vector, which may be called a feature vector) and a desired output value (also called the supervisory signal). As described above, training inputs may be images, for example. A training algorithm analyzes the training data and adjusts the behavior of the neural network by adjusting the parameters (e.g., weights of one or more layers) of the neural network based on the training data. For example, given a set of N training samples of the form $\{(x_1, y_1), (x_2, y_2), \ldots, (x_N, y_N)\}$ such that $x_i$ is the feature vector of the i-th example and $y_i$ is its supervisory signal, a training algorithm seeks a neural network g: X→Y, where X is the input space and Y is the output space. A feature vector is an n-dimensional vector of numerical features that represent some object (e.g., an image of a room with objects to be moved as in the example above). The vector space associated with these vectors is often called the feature space. After training, the neural network may be used for making predictions using new samples (e.g., images of different rooms).

At an operation 601c-3 spurious identifications and detections can be filtered out by using techniques such as non-max suppression (this example is not intended to be limiting) between objects from the same or different classes needed to generate an itemized statement. An AI algorithm may use variable optimized thresholds for achieving greater spurious suppression without (or substantially without) affecting true detections. For example, it may be likely to have two chairs or moving boxes next to each other. Thus, detections of two chairs with highly overlapping bounding boxes is likely to be correct. However, two detections of large refrigerators with high overlap are likely to contain one spurious detection (e.g., because it is unlikely that one house has two refrigerators, or further, two refrigerators positioned right next to each other). Similarly, the system is configured to recognize that detection of a jet-ski and a kayak next to each other is plausible, however, detection of a jet-ski next to a bed may be spurious.

The AI algorithm can also utilize context such as room (e.g., bedroom, hallway, kitchen, garage, living room, etc.) and object class (e.g., furniture, appliances, etc.) for suppression. Outputs from multiple data units may be combined on a logical basis (such as data belonging to a particular room or area) and form a block of data that is used for generating part of the inventory (e.g., for that room or area). For example, frames for a video segment recorded for a particular room may form a block of data. An object may be present in multiple data units, and thus be counted multiple times within a block of data.

At an operation 602c-1, an AI algorithm can be used to correlate an object across multiple past and future data units present in a block of data and ensure that the inventory estimate for the block is accurate.

At an operation 602c-2, an AI algorithm may use multiple techniques such as feature matching for objects, detecting a pan change in the input video, etc., to determine whether some data units within a block of data are duplicates of previous inputs. As an example, a user (e.g., a consumer) may inadvertently make multiple recordings of a given area such as by recording first from left to right and then right to left in order to arrive at a new location for recording. Similar to the operations described above, the system may be configured to use techniques for suppressing spurious identifications or transforming identified classes using context. These suppression algorithms can benefit from the processing of the data at the block level. For example, spurious detections at the level of an image frame can be suppressed using weighted temporal filtering. As another example, objects detected inside the bounding box of other objects such as mirrors and television sets may be suppressed. As another example, if a mattress is detected close to a headboard, the mattress is determined to likely be on top of a bed-frame and the AI algorithm can lower the confidence threshold for detecting bed-frames in the block of data.

At an operation 602c-3, the system may recognize that many objects may not be identifiable within a unit of data. As an example, an object may be partially occluded from a particular view, but may become more visible later in a user (e.g., consumer) recorded video. Similarly, a large object may never be completely visible within a single unit of data. As another example, an object may be identified as belonging to different classes in different units of data. An AI algorithm may utilize techniques such as weighted temporal filtering, strict class rank hierarchy, and contextual information, etc., to generate attributes of the objects identified in the block of data. As an example, the size of a bed may be detected as a king, queen, or indeterminate during detections on individual frames. However, at the block level the AI algorithm may use the outputs such as the confidence values for predictions and other meta-data to classify the object. Similarly, if an object is predicted to belong to two closely related classes that vary on sizes, such as a loveseat and a large sofa, the AI algorithm may use the confidence values of the predicted classes to adjust the volume and weight of the object.

At an operation 603c-1, an AI algorithm may utilize outputs of one or more blocks of data to generate ancillary data that is useful in accurate inventory estimate generation.

For example, packaging requirements for a bookshelf can be estimated by the system as a function of the size of the bookshelf.

At an operation 603c-2, an AI algorithm may be used to remove spurious objects across multiple blocks of data. For example, an inventory estimate of kitchen items may inadvertently include items from the living room that were present in a video segment for the kitchen as well as the living room.

At an operation 603c-3, an AI algorithm may also be used to select the units and/or fractions of units that can be used to present to the user. For example, an object may be present in multiple units. However, to present the object to the user only a single unit or a box identifying the object within that unit may be selected. The algorithm to select these presentation segments can optimize for one or more metrics such as review time, aesthetics, etc.

Figure 7:
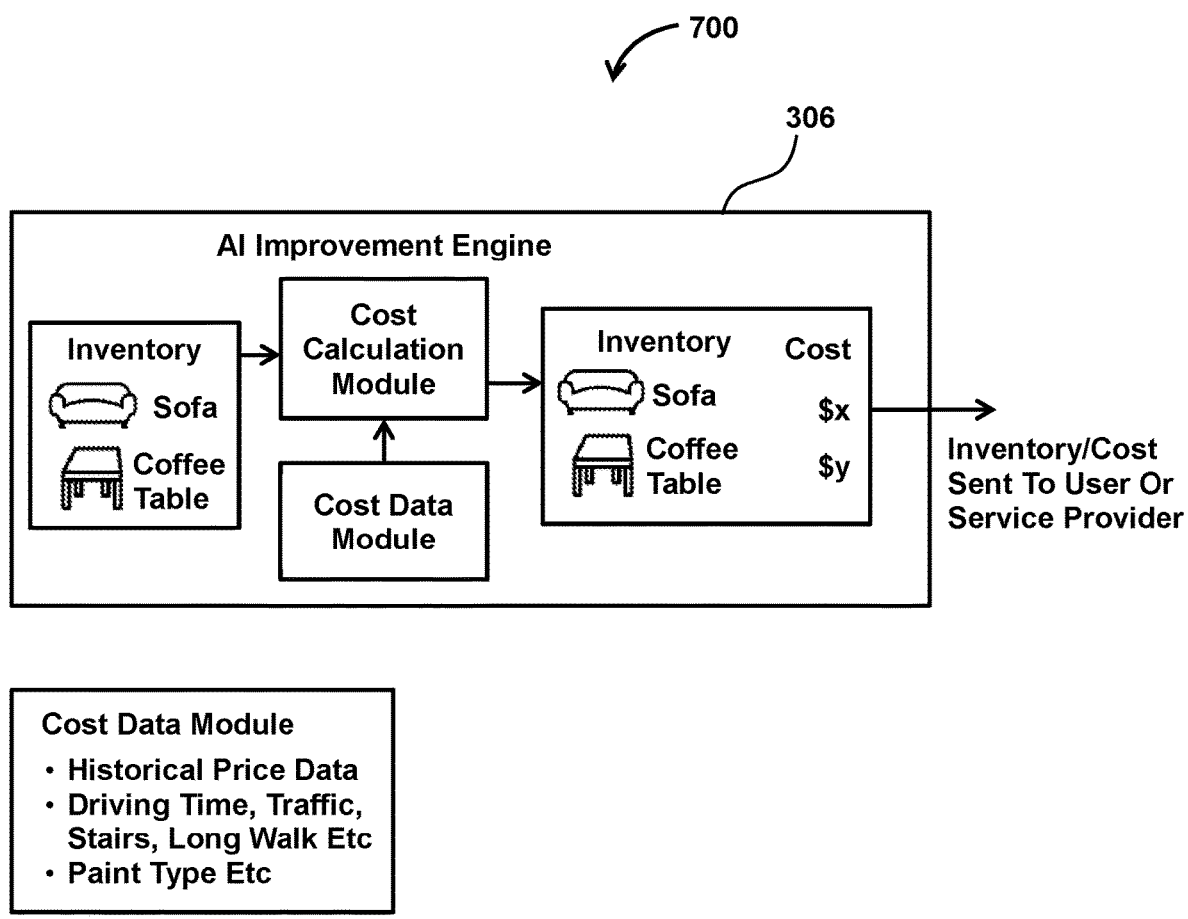
FIG. 7 illustrates an exemplary system for cost creation, in accordance with one or more implementations.

FIG. 7 illustrates an exemplary system 700 for cost creation. The inventory information may be fused with other cost data to generate cost per item for a specific service (e.g., moving, insurance, painting, widow cleaning, junk removal, and/or other services). Information for cost creation may be received from the consumer interaction module, third parties, the quote monitoring module, and/or other sources of input. Cost creation operations may be performed for based services along with additional service and product offerings related to the quoted base service, including additional service and product offerings not directly related to the quoted base service (e.g., as described herein).

Figure 8A:
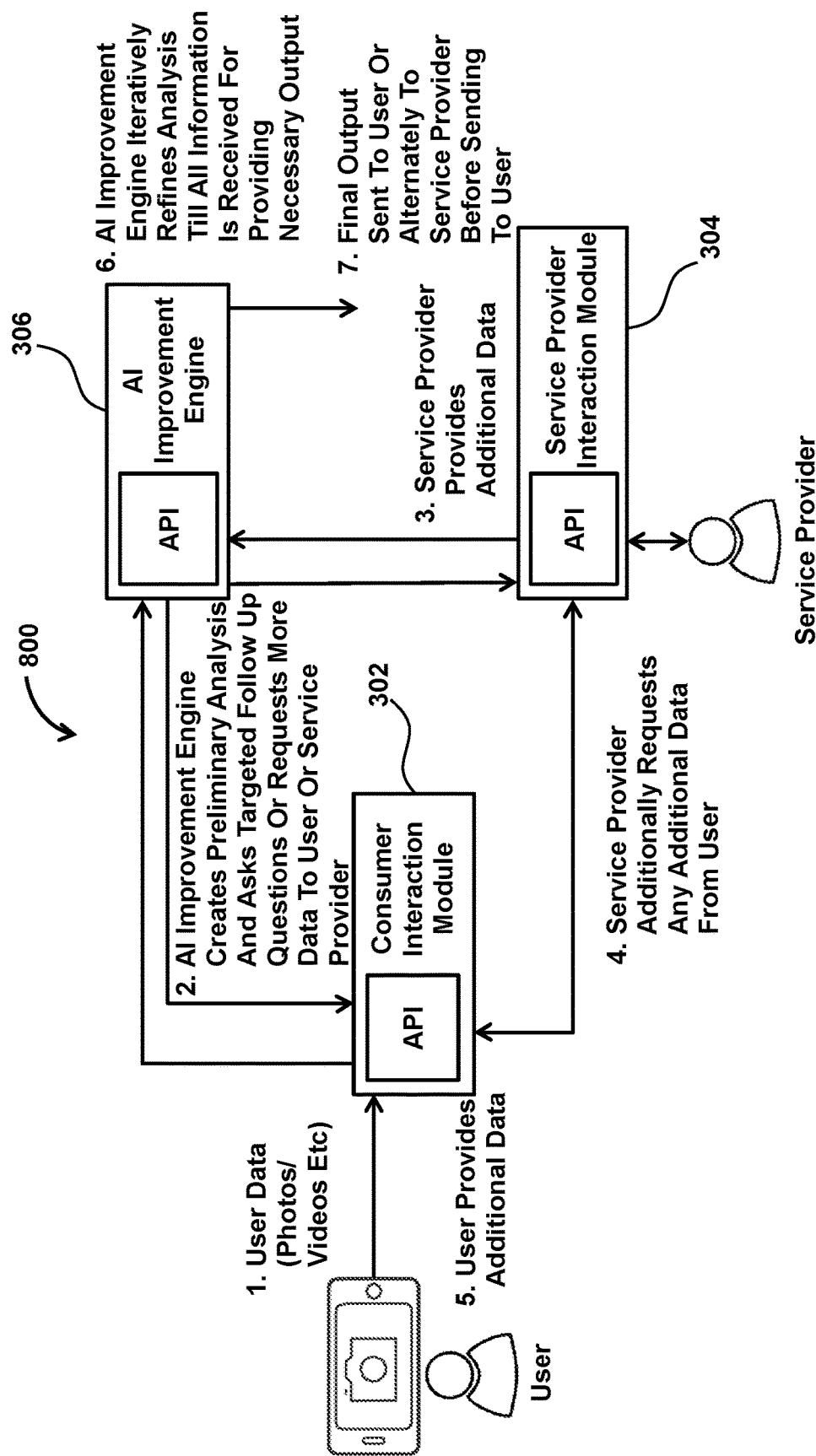
FIG. 8A illustrates an iterative way the user collects data, the AI improvement engine analyzes the data and asks relevant questions of either the service provider or user, in accordance with one or more implementations.

FIG. 8A illustrates a flow diagram 800 of an iterative way that AI and/or a human agent may ask relevant questions based on user data (text, image, videos, etc. sent, input, or otherwise acquired by the system (e.g., as in the case of sensor data)) to collect additional information needed to generate the quote.

Figure 8B:
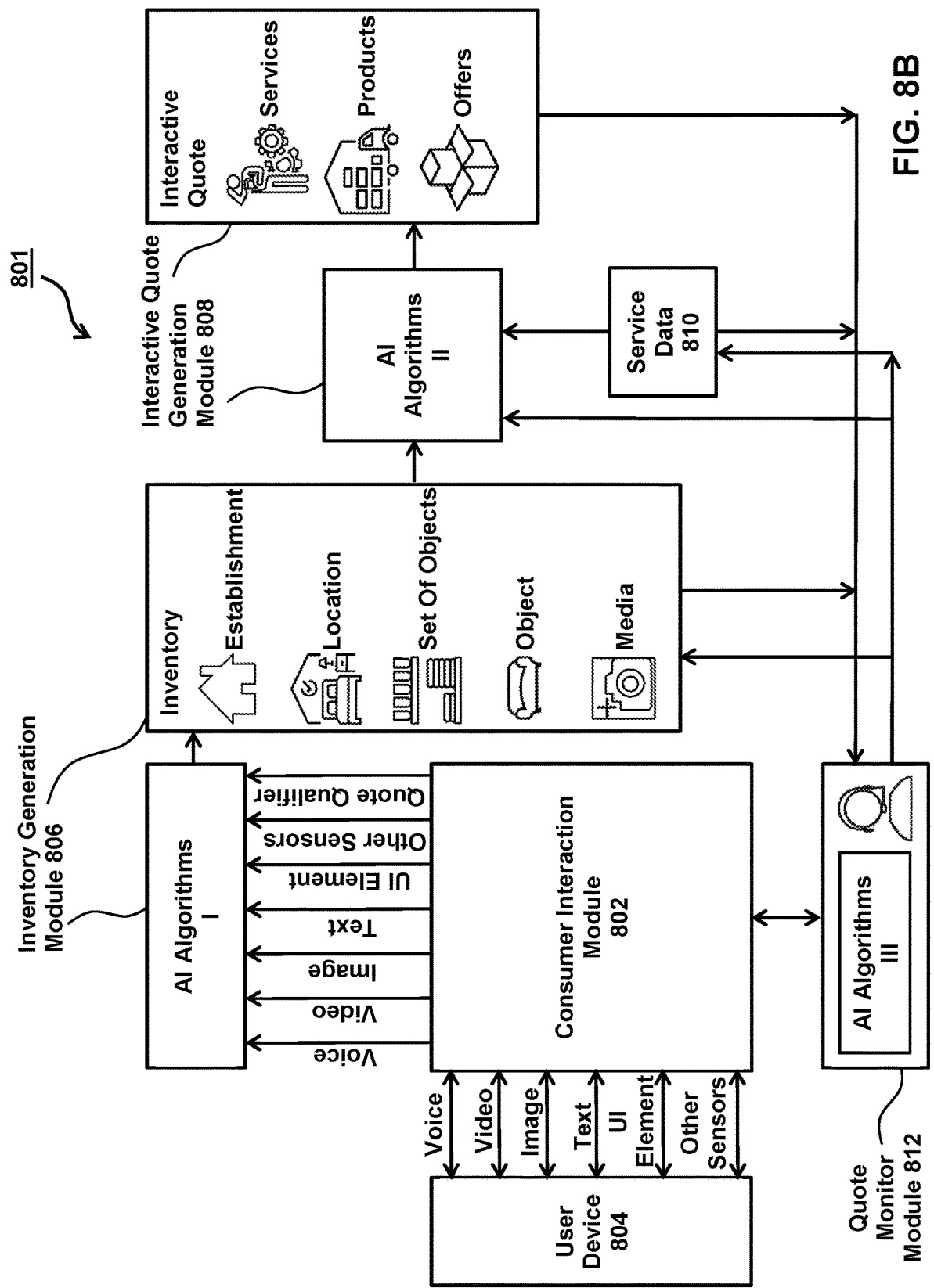
FIG. 8B illustrates an iterative way the user collects, data, the AI improvement engine analyzes the data and interactive quotes for products and service including in accordance with one or more implementations

FIG. 8B illustrates an exemplary implementation of the AI-based cost estimates for relocation services of FIG. 1 comprising a system 801 configured for providing interactive quotes for relocation cost estimates utilizing a machine learning model comprising one or more hardware processors configured by machine-readable instructions to execute the exemplary implementations described herein.

As shown in FIG. 8B, system 801 includes user device 804, consumer interaction module 802, inventory generation module 806, interactive quote generation module 808, service data module 810, and quote monitor module 812. In some implementations, as described herein, inventory generation module 806, interactive quote generation module 808, and quote monitor module 812 may include machine learning and/or predictive models including AI algorithms, which are trained in a similar fashion as the artificial intelligence model 200 of FIG. 2. In some implementations, as described herein, inventory generation module 806, interactive quote generation module 808, and quote monitor module 812 may include machine learning models and/or predictive models and correspond to AI improvement engine 306 and deployment server running AI framework.

In some implementations, as described herein, inventory generation module 806, interactive quote generation module 808, and quote monitor module 812 may operate in the same as or similar manner as receiving scanned data component 108, receiving key element data component 110, and generate statement component 112, respectively.

In some implementations inventory generation module 806, interactive quote generation module 808, and quote monitor module 812 may operate in a similar fashion as the AI improvement engine 306 of FIG. 3. In some implementations, consumer interaction module 802 may operate in a similar fashion as the consumer interaction module 302 of FIG. 3. In some implementations, service data module 810 may operate in a similar fashion as service provider interaction module 301 FIG. 3.

In some implementations, estimating the cost of moving one's belongings from one place to another may be a function of multiple variables. The multiple variables may include the number of items (e.g., furniture, boxes, special items like a piano, delicate items, and/or other items); the size and weight of the above items; if assembly and/or disassembly may be needed; if items need to be packed and if special care needs to be given while packing (e.g., fragile items); if the to and/or from address(es) have a dedicated and/or shared elevator(s), the number of stairs a mover needs to carry the items; the walk between the front door of the house and/or apartment to the truck; the distance between the from and the to address as well as traffic during time of day; and/or any other regulatory restrictions that may depend on the location of the user (city, county, state, country, etc.).

Currently, movers may be unable to give an accurate upfront quote to end customers without sending an appraiser to a home (for example). Even if an appraiser was sent to a customer's home, they most likely end up only visiting the address the customer moves from and not the address to which the customer moves. The present disclosure improves computer functionality and describes providing accurate moving estimates using techniques in computer vision, artificial intelligence, deep learning, and/or sensor (IMU) data in addition to text data: questions asked by a human agent or an AI bot based on sent images, videos and previous answers as well as answers by the consumer from a smartphone and/or other device.

In some implementations, a workflow may include a user launching an app, via user device 804, or another messaging channel (SMS, MMS, Facebook Messenger, web browser, etc.), the app may reside on user device 804. User device 804 may include a smartphone, tablet, and/or other device configured for scanning their room(s) and/or other locations. In some implementations scanning the room may facilitate generating description data of a location. As shown in FIG. 8B consumer interaction module 802 is configured to receive description data of a location, the description data generated via at least one or more of a camera, a user interface, and/or one or more environment sensors transmitted from user device 804. In some implementations receiving description data comprises receiving sensor data from the one or more environment sensors, the one or more environment sensors comprising at least one of a GPS, an accelerometer, a gyroscope, a barometer, a microphone, and/or other physical environment sensors. In some implementations, receiving description data comprises receiving user demographic data and/or other information. The user demographic data may comprise physical characteristics of a user, socioeconomic information of the user, geolocation information of the user (e.g., determined based on phone number area code, GPS sensor information for a phone associated with a user, etc.), and/or other information.

In some implementations, a user may interact with the system 801 through consumer interaction module 802. The user may input descriptive data about the location in the form of videos, images, voice, text, display and/or information. In some implementations, consumer interaction module 802 prompts the user to generate data consisting of at least one or more of voice, video, image, and text data. Consumer interaction module 802 may also prompt the user to generate data, via user device 804, in the form of user interface elements such as bounding box, buttons, and other graphic user interface features of user device 804. Consumer interaction module 802 uses display systems such as a display screen, touchscreen, or a computer mouse, a tracking pad, or a pressure sensor. Consumer interaction module 802 may also capture data from sensors such as a GPS, gyro, accelerometer, Wi-Fi-receiver, cellular-modern, and/or a barometer, via a user device 804.

In some implementations, consumer interaction module 802 can interact with the consumer using voice, video, image, text, UI elements such as dropdown list, and haptic feedback.

In some implementations, sensor data is captured by user device 804 and transmitted to the one or more processors at predetermined intervals with or without user interaction. Descriptive data may be acquired automatically through context aware and location aware environment sensors such as a GPS, accelerometers, gyroscopes, barometers, and/or other context aware and/or location aware environmental sensors. In some implementations, user device 804 may be configured to periodically transmit descriptive data to consumer interaction module 802. The periodic intervals may include 5 seconds intervals, 10 seconds, or other periodic durations.

In some implementations, the description data comprises one or more media types, the media types comprising at least one or more of video data, image data, audio data, text data, user interface/display data, and/or sensor data. For example, in some implementations, a user may dictate a voice input stating the location of the room in a building, the items inside the room, the attributes of the items, and/or other descriptive information of the contents within a location. In some implementations, attributes describe and/or indicate properties of an object and/or objects (e.g., type (furniture, appliance, etc.), size, weight, shape, quantity, fragility, importance (family heirloom, a single copy, expensive, etc.), etc.), a location of the object (a room, a house, an apartment, a warehouse, an office, at a mall, in a supermarket, in a consumer shop, on the third floor, on the patio, etc.), whether an object is related to one or more other objects (e.g., a dish in a set of dishes, a section of a sectional couch, etc.), a type of media used to record and/or input an object into the system (e.g., an image, a video, a voice recording, user entry and/or selection of information via a user interface, etc.), and/or other attributes. In some implementations, the user may transmit a video showing the contents within a location and/or a building.

In some implementations, consumer interaction module 802 may direct the consumer to record a voice narration of different objects in the establishment or a location in the establishment. For example, consumer interaction module 802 may ask the user to describe the objects in the kitchen that they want to be moved. The users' narration is then processed by the AI based algorithm to generate an inventory list. In some implementations, the AI based algorithm may cause the asking of follow up questions such as "what size is the refrigerator" by presenting the user images of different sized refrigerators and capturing the users' choices to estimate the size of the refrigerator.

Similarly, consumer interaction module 802 can request input in the form of images, or text. In some implementations, consumer interaction module 802 may request the use a camera on a smartphone device and prompt the user to touch the display on objects of interest. Consumer interaction module 82 may overlay a UI element such as a button or a bounding box around the touch screen display area and provide user a dropdown list of items using the location as a context (for example, in a kitchen area the dropdown list may contain fridge, microwave, dining table, dining chairs, wine-rack, etc.). In some implementations, the image captured from the camera along with the overlaid UI elements and the categories chosen by the user are then used to generate the inventory list.

In some implementations, the above implementations may be used in combination. For example, in a video, while the images from the video are used for object detection and other attribute determination as discussed herein, the user comments may be processed to determine the attributes of the object such as "this piano is fragile" or "please be extra careful with this painting" or "This fridge and stove range will not be moving". The attribute values can be used to provide feedback by augmenting the camera display with the UI elements such as a bounding box, or a button, or a color coded icon display scheme that provides the user information on the objects attribute values: for example, green boxes or buttons for objects that are classified to be part of the move and red as those that are not part of the move, or gloves icon for objects that are going to be handled with extra care, or tools icon for objects are going to be dismantled during the move and assembled at the end of the move. Similarly, the estimated dimensions, weight, volume, material, object class of the object may be displayed in the UI overlaid on the camera in an augmented fashion. The user may also receive feedback using voice, such as a copy of a user's narration associated with the object. Similarly, objects such as a door or a narrow pathway that may be necessitate objects that are being moved to be disassembled can be marked using a UI element in similar to an augmented reality system.

In some implementations, consumer interaction module 802 may direct the user to capture the contents in the establishment in a video (i.e., descriptive data). It may then select different images from the video and detect various objects in those images using AI based algorithms. In some implementations, inventory generation module 806 is configured to receive the video from consumer interaction module 802 and may further process the image or parts of the image using AI based algorithms to determine attributes of the objects in the image.

As shown in FIG. 8B, consumer interaction module 802 is configured to receive descriptive data from user device 804 and communicate the descriptive data to inventory generation module 806. In some implementations inventory generation module 806 is configured to generate an inventory based on the descriptive data and determine attributes of each item in the inventory list.

In some implementations, generating an inventory list includes generating an inventory list comprising a plurality of items, utilizing machine learning models (e.g. the AI described herein), based on the description data and/or other information. The inventory list comprises inventory attributes associated with the plurality of items related to a context of the plurality of items in the location. In some implementations, generating the inventory comprises determining the one or more inventory attributes and/or other information. The inventory attributes comprise one or more of establishment attributes indicating at least physical dimensions of a building corresponding to the location, location attributes indicating a location of the item within the building and/or the structure, attributes of a set of objects indicating shared attributes of a set of items of the inventory list, attributes of an object indicating attributes of a specific item of the inventory list, media attributes indicating attributes that apply to items within the scope of the one or more media types, and/or other information. In some implementations, inventory generation module 806 utilizes machine learning (e.g., the AI described herein) to generate an inventory list and inventory attributes for items in the inventory list. In some implementations, generating an inventory list applies machine learning based techniques such as deep learning, linear regression, neural networks, and/or other machine learning based techniques to create an inventory list.

In some implementations, each item on the list can describe attributes for any of the following: all objects in a given image, a specific object, a set of objects that share a property (e.g., class material that require special handling during move, walls in a given area that require a different type of paint, expensive items that may increase the cost of insurance) a location (e.g., a room, garage, backyard, or kitchen) at an establishment, (e.g., home, office, or any other service location). In some implementations the machine learning algorithms in the inventory generation module 806 may produce one or more attributes for each type of item in the inventory list. In some implementations, when the inventory type refers to multiple objects (e.g., a room or an establishment) each inventory attribute can be either a list of the individual object attributes, or some function of the individual attribute values (e.g., a sum, a mean, median, mode). In some implementations, the inventory may refer to a value that is determined using an artificially intelligent algorithm (such as a deep convolutional network, a neural network or linear regression) that utilizes individual attribute values as an input (e.g., determining the quality of objects in a household).

In some implementations object attributes, or inventory attributes, may include object type and quantity, volume, dimensions, area, density, weight, material, location inside the establishment. The attribute corresponding to the items may include quality, value, model, brand, color, style, finish, fragility, labor requirements. In some implementations attributes of the items may include clutter, e.g., small objects, close, items that can be packaged in a box. In some implementations, attributes may include whether the item causes an obstruction. In some implementations, obstruction can be an attribute for two different types of objects. For example, objects such as a bed that are large require disassembly may be identified as an obstruction. Objects such as a door that are not part of the move but will become an obstruction for a set of objects may also be associated with an obstruction attribute. For example, in some implementations, discussed in further detail herein, the interactive quote generation module 808 can estimate the most obstructive among multiple doors for example and determine which objects/items in the inventory list require disassembly/reassembly and may facilitate a quote or service to offer such.

In some implementations, as discussed above, the inventory can be of different types and can have differing attributes. The type of inventory groups the objects listed under the type to a spatial location (such as a room), or temporal segment (video recording segment), or to a shared attribute (e.g. fragile objects that require packaging). In some implementations, each inventory list can have different attributes such as: volume, quality, weight, labor requirements, object type & quantity, small objects/clutter, density, area, dimensions, value, color, object location, fragility, style, material, texture, finish, model, brand, obstruction, object list, packaging requirements, foldable, stackable, recline, item included in service quote, etc. in some implementations, the attributes generated are dependent on the type of service (e.g., painting, moving, insurance, etc.) and the subset of the service (e.g., packaging estimation, object value estimation, dimension estimation, etc.)

In some implementations, inventory generation module 806 may break down the inventory list to various levels of hierarchy and groups that share certain attribute values. For example, the inventory attributes may apply to a particular object such as a bed, or a couch, or a table. Similarly, inventory generation module 806 may consolidate or compartmentalize the output to a location and the attributes may apply to all objects in the specified location such as all items in a bedroom, or a living room.

In some implementations, inventory generation module 806 can generate an inventory for an image, or consolidate the output for a set of images. Similarly, the consolidation can be done for segments of voice recordings, textual inputs, and/or other media types.

In some implementations, inventory generation module 806 may also consolidate the objects based on shared attribute values. For example, inventory generation module 806 may consolidate objects that require packaging (e.g., all books in a bookshelf, glassware in kitchen, dishes in kitchen, clothes in a wardrobe/closet, or small items or in a room, items in the garage)

In some implementations, inventory generation module 806 can also provide a consolidated inventory for the entire establishment. An attribute of an inventory for the entire establishment can be either a list of individual attributes (for example, list of volume of each object), or a function of the individual values (for example, a sum of individual object volumes) or can be a value that is determined using an artificially intelligent algorithm (such as a deep convolutional network, a recurrent neural network, linear regression, some combination thereof, etc.) that utilizes individual attribute values as an input (for example, determining the quality of objects in a household). Such a scheme that utilizes multiple individual object attribute to determine the value of the attribute can also happen at other levels of hierarchy (for example, for objects in an image).

In some implementations, inventory generation module 806 may also generate the attribute values in multiple processing steps. For example, an object's type or category is first determined using artificial intelligence algorithms (such as determining an object to be a refrigerator), then the object may be classified to a size by choosing amongst a standard set of sizes, shapes, material, brand, among others. This enables the attributes such as the dimension, area, weight, value etc. to be estimated. In some implementations, the classification amongst the set of standard sizes may be done by requesting additional data from input, and third party, or database of images (e.g., via external resources 124 of FIG. 1), textual inputs, etc. Similarly, as an example, the object's brand, make and model may be useful in computing the value and quality attributes.

In some implementations, inventory generation module 806 may serve various functions and process different inputs and outputs. For example, inventory generation module 806 may select a subset of images from the video and apply object detection on these images. In some implementations, inventory generation module 806 may also determine the dimensions of the objects and structure (such as a door).

In some implementations, inventory generation module 806 may estimate the time and labor requirements for objects that will require disassembly and assembly and increase the labor requirements attribute of the objects. Inventory generation module 806 may also determine the material and style of the object that may in turn be used to estimate the density and thickness of the object, which in turn can be used for estimating weight.

In some implementations, determining inventory list attributes include material detection that can be used for determining the packaging requirements for the object. For example, glass or marble on top of a table can be used as an input to the algorithms that generate the value for packaging requirements attribute. The object type can also be used as an input into the packaging requirements. For example, if a flat screen TV is detected then the packaging attribute for this object (or an inventory type that include this object) will be increased. In some implementations, the object type can also be used as an input into the packaging requirements for objects placed or stored inside the object. For example, detection of a china cabinet, or kitchen cabinet can be used to estimate the fragility and packaging requirements for the objects inside.

In some implementations, inventory generation module 806 may also be used for estimating increased service time due to the establishment's distance to a parking space, for example. This can be done by estimating the horizontal distance, and time spent in moving objects across staircases, or inside elevators. In some implementations, inventory generation module 806 may estimate the additional time by using a video or a set of images or analyzing the voice recordings or by using sensor data such as a barometer. In some implementations, discussed in further detail below, inventory generation module 806 may also make use of service data provided by service data module 810, to estimate, part or whole of the above time requirements, such as previously analyzed data, or third party data. In some implementations, the one or more processors are configured to adjust a relocation cost estimate based on at least one or more of physical attributes of the plurality of items in the inventory list including fragile items, small items, and/or other special care items determined based on the inventory attributes, and physical attributes of the location including accessibility, distance from main road, presence of elevators or stairs and/or other physical attributes of the location.

In some implementations, consumer interaction module 802 is configured to receive a quote qualifier from quote monitor module 812. In some implementations, the particular prediction model or machine learning model that is used for a particular input is determined by a quote qualifier input. The quote qualifier also includes input data such as the service data that may not be received directly from the user or user device. The quote qualifier may consider information related to the user's previous history and/or demographic data and adjust quotes and offers for products and services.

In some implementations, quote monitor 812 may be configured to implement reinforcement learning-based techniques for machine learning models. For example if the interactive quote module provides a deeper level of service, and the user ends up lowering the level of service before choosing the service, or provides the associated high cost as a reason to decline the service, quote monitor module 812 utilizes reinforcement learning to lower the default quality of service for other services to the user, or adapt, for other future users that share similar demographics and other similar qualities. Conversely, quote monitor 812 may also increase a quality of service and/or the default service quality level.

In some implementations, consumer interaction module 802 takes inputs from the user and quote monitor module 812. Consumer interaction module 802 provides input to inventory generation module 806. As discussed above, inventory generation module 806 receives input in the form of voice, video, image, text, display data, and/or other environmental sensor data, as well as directives in the form of quote qualifiers, and generates an inventory list using particular prediction model/machine learning models based on the quote qualifier. In some implementations, consumer interaction module 802 may function similarly as consumer interaction module 302, 402 of FIGS. 3 and 4, respectively.

As shown in FIG. 8B, in some implementations system 801 includes service data module 810. Besides the inventory and inventory attributes, directly related to the service there is other data that may be useful in providing the user with an interactive quote for the service and other useful products and services. For example, service data module 810 may receive as input source and destination addresses, zip codes, appraisal data, source and destination statistics, topology maps, street maps, may be useful. For example, the distance to the closest available parking space can be estimated using street view and/or satellite maps. Similarly, the vertical distance may be estimated using the topology maps.

In some implementations, service data module 810 may be configured to estimate a typical quality of service. The typical quality of service expected by user can be estimated by data not associated with the move. For example, a user communicating using a premier device and/or a zip-code with high average house price, or average income may expect high quality of service. Similarly, if the user is communicating using high speed internet, or newer operating system, the default quality of service offered to the user may be higher than other users. Other third party data such as the demographic information about the user can be used to determine the quality of service and price, and auxiliary service offered to the user.

In some implementations, service data module 810 includes data utilized in selecting objects that require direct or auxiliary service. For example, if a user is moving from a suburb to an apartment in a high-rise that lacks a patio, the patio-furniture will not be selected for the moving service. However, the user may be interested in selling or discarding the patio-furniture and may need to connect with a reseller marketplace, or junk removal or charity organization. Thus, in this case service data module 810 used to provide an accurate quote for the service and an auxiliary service of interest to the user.

In some implementations, service data module 810 may be configured to receive service data directly through consumer interaction module 802. This includes, demographic information, source and destination addresses, and types (apartments, independent house, and floor), service options, profession and annual income, family information, and other interests (such as sports, games, indoor and outdoor activity). Other information that may be directly provided by the user may include whether the destination address is bigger or smaller than the existing house, reasons behind the move, whether they are new to the area. This information may be used to provide relevant product and services to the user.

In some implementations, service data module 810 may be configured to receive temporal data including but not limited to, the seasonal, weekly and daily demands for the dates of requested service, weather and road conditions, resource availability, and other information related to the service dates. This information may be used by one or more other modules of the system to generate and/or adjust the interactive quote, and/or for other purposes.

In some implementations, the cellular provider for the user may also be part of the service data included in service data module 810. Service data module 810 may be configured to receive demographic data of the user. In some implementations, demographic data of the user may be communicated via the device 802. In other implementations, demographic data may be obtained from a third-party (e.g., via external resources 124 of FIG. 1)).

In some implementations service data module 810 may function similar to service provider interaction module 304 of FIG. 3. For example, the service data module 810 may serve as an interface to allow service providers to review information from consumers and AI analysis, make corrections if needed, and communicate with a user. The service data module 810 may have the capability for a service provider to review the quote, send it back to the user through the appropriate messaging. Demographic data of the user may also be acquired from service providers via service data module 810. Service data module 810 may also include the area code for the phone number of the user, operating system, and make/model of the user CPU platform 204. Demographic data may also be used to make offers of products and services unrelated to the move but related to the user.

In some implementations, service data module 810 may also receive projections and predictions related to the move, including but not limited to weather, road conditions, and seasonal/weekly/daily demand for moving services and supplies. Such information may be used to determine and/or adjust an interactive quote, offers and products, and/or other information based on conditions such as weather, road conditions, seasonal/weekly/daily demand for goods and services, etc.

In some implementations, service data module 810 is can may be configured to receive the input as discussed above and generate various information used by system 801. In some implementations, service data component 804 is configured to generate data received directly from user as input through consumer interaction module 802 via the user device 804. For example, an image could be used for the determination of a height of the establishment acquired from the sensors.

In some implementations, service data module 810 via consumer interaction module 802 receives information acquired from the sensors of the user CPU platform 204 for example a location of the establishment using the GPS, or height of the establishment, the pressure surrounding an establishment using the barometer, and/or other information. In some implementations service data module 810 may generate information acquired or inferred through user communication. For example, the operating system and device make/model. In some implementations, service data module 810 generates information acquired or inferred through other means for example demographic information input by the user or attained from a third party.

In some implementations, service data module 810 processes data that is presented as input to the interactive quote generation module 808. This includes source and/or destination establishment data and establishment attributes. For example, source and destination establishment data may include data related to the location of the source building and/or the destination building, appraisal data and statistics of the source building and/or the destination building, a satellite view of the source building and/or the destination building, and topology maps of the source and/or destination building, and a street view of the source and/or destination establishment. In some implementations, interactive quote generation module 808 may receive as input service data from service data module 810.

In some implementations, interactive quote generation module 808 may be configured to generate, utilizing the machine learning models (e.g., the AI described herein), one or more interactive quotes for relocation cost estimates comprising at least one or more offers for products and/or services based on the plurality of items in the inventory list and the inventory attributes. In some implementations, interactive quote generation module 808 may take the inventory, attributes, and service data as input and generate an Interactive Quote comprising details of primary service (e.g., price, fleet and/or crew, service dates, etc.), add on service and products related to the primary service (e.g., labor costs for packing, unpacking, dismantling, assembling, etc.; junk removal or donations; re-seller marketing, etc.), and auxiliary products and services (e.g., packing material, paint, brushes, insurance, new furniture for a bigger house, etc.). In some implementations, for example, the interactive quotes comprise one or more of a relocation cost estimate, and add-on relocation services and/or products comprising at least one or more of packing/unpacking services, disassembling/reassembling, junk removal, donations, reseller marketplaces, packaging material, insurance/maintenance contracts on service, and/or other information.

In some implementations, interactive quote generation module 808, may estimate the relocation labor costs by using the attributes of the inventory and service data provided by the inventory generation module 806 and interactive quote generation module 808, respectively. This may occur over multiple steps and iterations or refinements. For example, the time required for moving objects from the establishment to the parking may be estimated using the service data such as street maps, satellite view, topology maps, around the source and destination. The time may be estimated using historical records around the addresses provided. When such estimates are unavailable, an approximate time may be assumed, or direct user input may be used. In some implementations, quote monitor module 812 may be utilized for this purpose, and the user may be asked to provide data (either as an estimate, or for example, through a video recording that is processed by inventory generation module 806).

In some implementations, interactive quote generation module 808 may select a subset of objects for the service. For example, if the destination does not have a patio, any patio furniture at the source establishment may be removed from the moving service quote. Similarly, if during the interaction the serve attribute of an inventory object is changed, for example, the user may request that appliances need to be moved, then the subset of the inventory items that is selected for service will be modified accordingly.

Interactive quote generation module 808 may combine inventory attributes based on shared attributes. For example, chairs that are similar and can be stacked may be combined to produce a smaller volume. Interactive quote generation module 808 block may use weight and volume of different inventory objects selected for the service to estimate the labor costs of moving the objects through the establishment to the parking space and vice versa at the destination.

In some implementations, Interactive quote generation module 808 may also estimate volume requirements that can be used for fleet and crew requirements by the service provider. Interactive quote generation module 808 may also flag certain voluminous objects (for example, beds, or large tables) that may need to be disassembled to reduce transportation cost. Interactive quote generation module 808 may detect bottlenecks in moving the objects out of the service establishment (or inside the destination when data is available). Interactive quote generation module 808 can use the attributes of the objects such as weight, volume, dimensions, value, quality, material, finish, fragility, etc. to provide a quote for labor requirements to disassemble and assemble the object.

In some implementations, interactive quote generation module 808 may use the clutter, packaging requirements, of the inventory to estimate the packaging-unpackaging costs. For example, interactive quote generation module 808 may estimate costs for packaging material such as boxes, tapes, and the labor requirements for packaging-unpackaging small objects (clutter), books, clothes, etc. In some implementations, interactive quote generation module 808 may also estimate the packaging-unpackaging requirements for fragile objects such as chinaware, glassware, flat screen television sets, glass top tables, mirrors, wall arts, etc. This includes packaging material such as boxes, bubble-wrap, tapes, etc. and the labor costs.

In some implementations, interactive quote generation module 808 may use attributes such as value, quality, fragility from the inventory as well as service data to offer insurance for protecting the objects during the service, for example, for expensive television sets, or wall decoration or painting, etc.

In some implementations, interactive quote generation module 808 may use attributes such as quality, value, etc. of the inventory objects that are not included in the moving service and offer junk removal service for these objects. Similarly, interactive quote generation module 808 may provide users access to reseller marketplace services. It may also provide an estimate of the selling price of similar objects in these marketplaces. As an alternative, interactive quote generation module 808 may provide means for donating the objects to charity organizations.

In some implementations, interactive quote generation module 808 may offer services that may be related to the primary service being requested. For example, interactive quote generation module 808 may estimate the cost of cleaning the source and/or destination establishment and provide the offers for this service. Similarly, a painting service may be offered at the source and/or destination of the move.

Interactive quote generation module 808 may estimate the requirements for material required for the services and offer these products such as boxes, tapes, label-maker, etc. for moving or paints, brush, putty, etc. for painting.

In some implementations, Interactive quote generation module 808 may offer products and services that may be auxiliary to the primary service. For example, using the inventory attributes, such as object types, serve, location, material, finish, color, texture, model, make, material, brand, style, etc. and the service data such as number of bedrooms, number of floors, and other physical features of the establishment. Interactive quote generation module 808 may offer additional furniture, equipment, appliances, etc. at the destination. For example, if the refrigerator is not being moved, interactive quote generation module 808 may provide offers for refrigerators that match the style of other kitchen items that are being moved. In some implementations, if the move destination has a patio whereas the move source did not have a patio, interactive quote generation module 808 may use the inventory attributes such as style to provide offers for patio furniture that it may determine to be preferred by the user. Similarly, yard tools and storage for yard tools may be offered in such a scenario. In some implementations, if the move destination has additional bedrooms, interactive quote generation module 808 may use inventory attributes to offer beds that may match the color, style, finish, size, etc. of the beds at the source of the move. For example, if the source has more rooms such as two separate room for children and the destination has one room for children interactive quote generation module 808 may offer a bunk bed.

In some implementations, interactive quote generation module 808 may also provide offers for upgrading objects in the inventory using the attributes such as value, weight, material, quality, color, style, size, finish, etc. For example, if an inventory item has high volume and or/weight, and low value, quality attributes, such as a large old refrigerator, then interactive quote generation module 808 can offer the user access to a reseller marketplace at the source location of the move, access to marketplace to buy an upgraded or higher quality refrigerator at the destination and save on the costs of moving the refrigerator. Interactive quote generation module 808 may offer use product offers for objects that are not present in the inventory, but are commonly used at the destination. For example, weather related products such as umbrellas, sun-screen, or outdoor activity related products such as a kayak, or bicycle, or other outdoor equipment. In some implementations, interactive quote generation module 808 can also offer access to products and services at the destination such as homeowners' insurance or renter's insurance, or auto insurance using contextual data such as the user's inventory and service data.

In some implementations, interactive quote generation module 808 can offer services at the destination such as cleaning service, gardening service, auto maintenance and service, handyman, electrician and plumbing and repair services, etc. using the contextual information from the inventory and service data. For example, regular garden maintenance cost can be estimated using service data such as satellite view, historical pricing data for such services in the area. Similarly, offers for cellular service providers and internet and cable service providers can be made based on the quality and availability of user's existing service providers at the destination and contextual information. As another example, offers from local dealerships and auto repair shops for the type of vehicles in the inventory or provided by the service data can be provided to the user.

In some implementations, interactive quote generation module 808 can offer services such as gym memberships, transportation service passes, club memberships, classes, events and organization advertisements, restaurant coupons, etc. using contextual information from the inventory and the service data. For example, if the gym equipment is marked as not being moved, the user may be offered a gym membership at the destination. Similarly, Interactive quote generation module 808 may use the service data and inventory to infer consumer interests such as indoor/outdoor sports, music and arts, food and drinks, cooking, children's activities, etc. and may provide consumer the offers of interest for these activities.

In some implementations, as shown in FIG. 8B, in some implementations, quote monitor module 812 obtains inputs from the user through consumer interaction module 812 and provides inputs to inventory generation module 806 and interactive quote generation module 808. Quote monitor block 812 also received as input inventory and inventory attributes generated by inventory generation module 806 and modifies the attributes of the inventory, and provides such modifications as input to the service data module 810. Quote monitor block 812 also processes the services, products and offers generated by the interactive quote generation module 808 and presents to the user through the consumer interaction module 802.

In some implementations quote monitor 812 includes machine learning models and/or predictive models including AI algorithms for performing the following features. Improving the estimate of inventory attributes by observing the attribute values and requesting appropriate data from user. Creating inputs for consumer interaction module 802 such as presentation of follow up questions to the user, user directives instructing the user to input more descriptive data, setting of the quote qualifier input for inventory generation module 806. In some implementations, quote monitor module 812 may receive input from consumer interaction module 802 that is not directly related with generating the inventory. Quote monitor module 812 may provide inputs to the interactive quote generation module 808 to create services and products for the consumer. In some implementations quote monitor module provides inputs to service data module 810, and presents an interactive quote to the user. In some implementations, quote monitor module 812 may prioritize offers created by interactive quote generation module 808.

In some implementations, quote monitor module 812 may request the user to move to a new location and change a viewing angle of the camera on their device using the Inventory as an input. In some implementations, interactive quote generation module 808 may guide the user to this new location for multiple reasons. For example, if inventory generation module 806 determines that a large object is detected, the user may be guided to a different location to improve the estimates on the dimensions, material, weight, object type, density or other inventory attributes of the object. Similarly, a different location and view can be requested for determining brand, make, model, value, quality, attributes of the object. If the object is determined to require disassembly the user may be requested to input descriptive data that is useful in estimating the volume of disassembled pieces. Another reason may be to ensure that the entire establishment is covered in the video and there are no occluded objects (for example filing cabinets behind desks, or a piece of furniture behind a curtain).

In some implementations, quote monitor module 812 may request user actions based on the inventory attributes. For example, if a wardrobe is detected, the AI algorithms may request the consumer to open the doors to improve the estimated packaging requirements. Similarly, if a cabinet is detected, quote monitor module 812 can request user to open the cabinet to improve the estimate for packing objects inside the cabinet.

In some implementations, quote monitor module 812 may request follow up questions from the user based on the inventory attributes. For example, if an object that may recline is detected (such as a reclining sofa), quote monitor module 812 may request a confirmation from the user. It can then modify the attribute value using the response from the user. As another example, if appliances such as washing machines, refrigerators, etc. are detected quote monitor module 812 can ask the consumer if the appliance are to be moved.

In some implementations, quote monitor module 812 may change the Inventory attributes in response to inputs from the user or the Service Data module. For example, if the user selects a white glove service the packaging requirements attribute of Inventory may be increased.

In some implementations, quote monitor block 812 may request user feedback for inventory attributes with undetermined object type value, or where the confidence on the object type is low. Quote monitor block 812 may provide the user some likely choices on selecting the object types.

Quote monitor module 812 may move items of certain inventory attribute out of service using inputs from the service data module. As an example, if the service data indicates that the destination does not have a yard or a patio, quote monitor module 812 may remove yard tools, and patio furniture items from the moving service.

In some implementations, quote monitor module 812 may infer user interests based on the inventory. For example, if the user has books on cooking, the system may infer the user is interested in outdoor activities and may obtain responses from the user to prioritize the offers presented to the user. Quote monitor module 812 may also create service and product bundles from interactive quote data. For example, it may apply a discount on the service if the packaging material is bought from the service provider.

Quote monitor module 812 may also provide input to the interactive quote generation module 808 in order to change the subset of algorithms that need to be applied. For example, if the user chooses a white glove service, quote monitor module 812 may request the generation of inputs to the inventory generation module 806 to process the packaging and handling inputs and recreate the interactive quote produced by interactive quote generation module 808.

In some implementations, the one or more processors are further configured to determine a user directive based on the user input, the one or more inventory attributes, and/or the plurality of items in the inventory list. The user directive comprises an indication to change the descriptive data determined based on the user's location and camera angle, change the descriptive data based on the user directive; and determine an adjusted interactive quote based on the change in the descriptive data. In some implementations, quote monitor module 812 may direct the consumer interaction module to provide user cues through the use of UI elements, or voice, text, and haptic feedback (e.g., a vibration function of a smartphone), etc.

In some implementations, an AI algorithm may cause the asking of targeted questions based on images and/or videos sent by the user to perform further analysis (e.g., questions may relate to whether the cabinet full or empty, whether the user can also send a video or picture after opening the cabinet, whether the cabinet bolted to the floor, etc.). The AI algorithm may also ask for additional pictures or video. An AI algorithm may use answers to questions asked by a trained human agent to perform further analysis.

In some implementations, the targeted questions include user directives. In some implementations, the one or more processors are further configured to determine a user directive based on the user input, the one or more inventory attributes, and/or the plurality of items in the inventory list; wherein the user directive comprises an indication to change the descriptive data determined based on the user's location and camera angle.

For example, in some implementations, the descriptive data including the voice, video, image, or text data may not clearly show the items in the location. Accordingly, quote monitor 806 may generate a user directive that instructs the user to reacquire the descriptive data (i.e., perform another scan of the location) in order to generate more accurate quotes for services and products and other offers.

For example, in some implementations, quote monitor block 806 can receive input from consumer interaction module 802, inventory generation module 806, interactive quote module 808, and other service data related modules, and quote monitor module 812 can monitor the inventory list and direct consumer interaction module 802 to create a change in the user's location and camera angle. The change can be requested for improving the estimate of any of the attributes in the inventory for example if occlusion is detected in an image or video the user is directed to a newer location and to change the viewing angle to improve on included objects for volume estimation.

In some implementations consumer interaction module 802 may achieve the change by providing cues on a display, voice or haptic feedback via the user mobile device. In some implementations, quote monitor module 812 may receive input from the service data module 810 and inventory list from inventory generation module 806 to direct consumer input by issuing user directives. For example, if the distance to the closest parking space used for moving services is not available with high confidence, quote monitor module 812 can issue a user directive that can direct the consumer to provide input on the distance to the park space. The user may be directed to input video, voice, images, text and or other descriptive data. In some implementations, consumer interaction module 802 can request this input from the user using multiple means of such as voice, image, video, text. Quote monitor module 812 can also use consumer interaction module 802 to prompt user actions. For example, if the cabinet is found in the inventory the user may be asked to open the cabinet to improve estimates for packing. Quote monitor module 812 may direct consumer interaction module for user input to modify the contents of interactive quote. For example, if the destination does not have a patio or backyard, quote monitor module 812 they removed the mark patio items—related costs from the interactive quote and request a confirmation from the consumer.

In some implementations quote monitor module 812 may receive input from consumer interaction module 802 and adjust inventory attributes. For example, if the consumer requests extra care for an item (e.g. an old piano) quote monitor module 812 can increase the fragility attributes of this object. Quote monitor module 812 may also observe the consumer input, service data, and inventory list and associated attributes of items of the list and suggest add-on services such as insurance, packaging for additional items. For example, quote monitor module 812 may detect an expensive TV, mirror, sculpture, or other fragile item, and can offer a packaging box to protect the TV, mirror, sculpture, or other fragile item during the move.

Example workflow may include, location information (e.g., the from/source and/or to/destination address) may be taken as input either from the user and/or automatically by turning on location sensors in the phone or other device. This information may be combined with various sources of data (publicly available or otherwise) such as driving time, driving distance, number of floors in all locations, if any intermediate stop may be needed, the availability of a shared or dedicated elevator, and/or the distance of the walk from the home to the where the truck may be parked or other regulatory information based on the location of the user. An itemized quote may be generated by combining the above information with the objects detected in the room or other location and thereby providing an accurate cost estimate for moving every single object or for additional services (disassembly, packing, etc.). The itemized quote may be provided to the consumer app (with the app working with a backend). The object detection algorithm may identify objects and their dimensions and/or may generate insightful options based on the detection (e.g., if a delicate piece of china is detected, the technology may suggest a packing service to the customer and the cost for packing while simultaneously comparing the time it may take the customer to pack it themselves). The technology may identify items that need assembly and disassembly and suggest it as options with the appropriate cost. The app may call a junk removal service for items that the customer does not want to have moved but would rather have it donated or discarded. The user may review the itemized quote and make necessary changes as desired. By way of non-limiting example, if the disassembly of a dining table adds too much cost, the user may remove that line item and the price may update in real-time. Once the quote looks good, the user may book the moving job from the app. Users or service providers may manually select items that the estimation algorithm has not discovered and label them (e.g., a chair that was partially occluded by a dining table). In case the object may be not detected, users may be able to draw a simple bounding box in the app which may then be sent to the backend for further processing to select the item. Users may add and/or remove items from the itemized quote in a similar fashion to how they may add and/or remove items to an online shopping cart or through a simple user interface such as swiping left to discard an item (that is not part of moving quote) and swiping right to add the item to the moving quote. Quote information (which could be an inventory list, cube sheet, etc., and may or may not contain price information) with relevant photos and/or videos extracted from the surveying process may be sent electronically to the mover's backend system for fulfillment.

There may be multiple concerns shoppers face when shopping for furniture. Aside from cost and comfort considerations which consumers may be able to experience when they visit a furniture showroom, there may be several considerations which may not be solved in a feasible way even with visiting a furniture shop. Considerations may include "Will my new furniture fit my room?", "How well would it go with my existing items?", "Does the color match the overall decor?", and/or other considerations. The present disclosure may solve such problems using a combination of smartphone technology where the camera and/or sensor (IMU) information may be fused with techniques in computer vision and/or artificial intelligence.

In some implementations, a workflow may include a user launching an app or another messaging channel (SMS, MMS, Facebook Messenger, web browser, etc.) on one or more of a smartphone, tablet, and/or other devices and scanning their room(s) or other locations. The app may collect one or more of camera frames, IMU data, and/or other data. An AI algorithm (or deep neural network) trained for object identification may be used to identify objects (furniture, lamps, and/or other items) in the room, and/or to estimate the dimensions and/or volume of the objects. Such a technique may combine artificial intelligence techniques such as a deep neural network and/or sensor (IMU) data to generate an accurate identification of the object, including the object's size and/or weight. Users may be able to tap on objects detected by the detection algorithm they want replaced. In case the object may be not detected, users may be able to draw a simple bounding box in the app which may then be sent to the backend for further processing to select the item. The algorithm may automatically match the item size with a similar item of a similar size. Users may then add preference of selection of one or more of color, material, fabric, and/or other preferences. The app working with a backend may suggest recommended items based on one or more of size, type and/or other aspects of an item chosen and/or on how well the recommended item matches with other items and/or paint color in the room. An AI algorithm may ask targeted questions based on images/videos sent by the user to perform further analysis (e.g., asking the user to take a picture from a different angle etc.). An item may be then displayed on the screen superimposed on the actual image with the correct dimensions. To choose a single item, the user may want the AI to completely redecorate the house or other location. In that case, the AI with knowledge of existing items, their relative location, and/or other surrounding information (e.g., accessories, wall color, and/or other surroundings) may recommend items and/or lay the items out in a virtual pattern for display to the user via a user interface on the smartphone screen. The users may be given a choice to purchase one or more items directly from the smartphone and/or other device. The app may sell leads to furniture suppliers to promote their products in relevant spaces. This may grow into an automated advertising network where the bidding process may be started by an algorithm determining a category of product that would be useful to the consumer (e.g., leather sofa etc.), then auctioning off ad real estate to the highest bidder in the category.

Currently the process of obtaining a renter's insurance, homeowner's insurance, homeowner's warranty, and/or hazard insurance quote may depend on the value of the user's individual possessions. The process of getting a quote may rely on users calling the insurance company and describing their possessions. The present disclosure describes an automated way for users to obtain insurance quotes, save their data, and/or automatically verify with insurance companies in case of loss.

In some implementations, the workflow may include the following. A user may launch an app or another messaging channel (SMS, MMS, Facebook Messenger, web browser, etc.) on a smartphone, tablet and/or other device and scan their room(s) and/or other location(s). The app may collect camera frames, IMU data, and/or other data. An AI algorithm (or deep neural network) trained for object identification may be used to identify objects in the room, and/or to estimate the dimensions and/or volume of the objects. To identify items, the object detection technology may be able to identify auxiliary information such as brand of item and/or its estimated cost. The app working with a backend may generate an itemized list of objects that the user owns (or possesses). The user may be able to select items the object detection technology may not be able to detect on the app by drawing a simple bounding box and/or annotating the object with the correct label (e.g., TV, speakers, and/or other objects). The app may ask for further information (e.g., brand, year of purchase, and/or other information). An AI algorithm may ask targeted questions based on images/videos sent by the user to perform further analysis. Once the user is sufficiently satisfied, the list may be sent to different insurance companies to get a competitive quote. The data for the user may be saved until it needs to be updated and/or a claim event happens. In case of a claim event, the claim may be verified and/or users may be paid automatically based on the list of items in their possession as verified by the app. In some implementations, the claim verification process may be performed in the app using visual and/or audio inspection trained by deep neural nets.

Figure 9:
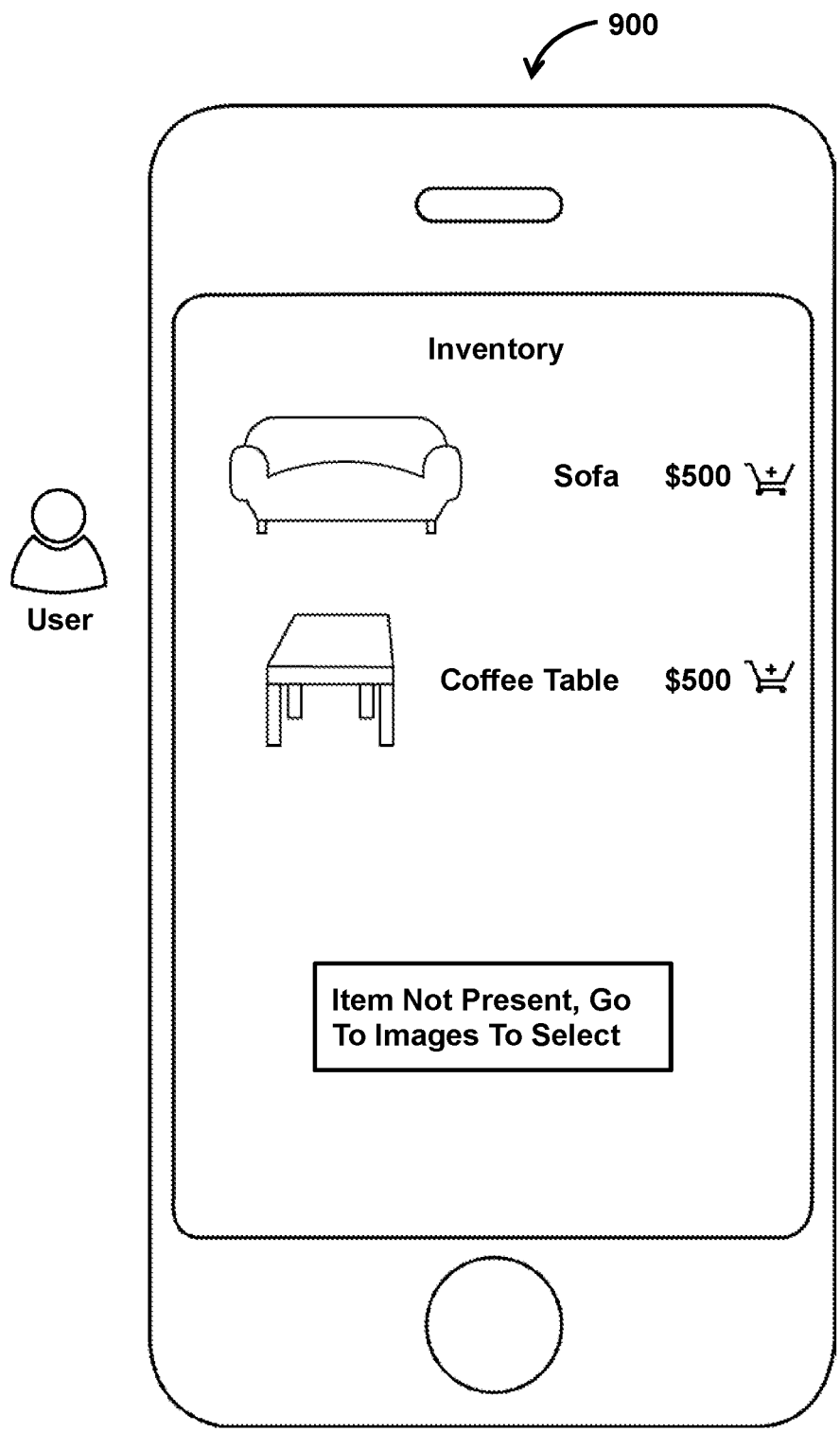
FIG. 9 illustrates user additions to cart, in accordance with one or more implementations.

FIG. 9 illustrates a device 900 showing user additions to a cart, in accordance with one or more implementations. The inventory and/or cost may be shown to the user. The user may add the needed items to cart (e.g., items needed to move, walls needed to be painted, and/or other items). The user may be given a choice of items that may be missing. The user may go back to original image and draw a simple bounding box to highlight items which will are to be added back to the cart.

Figure 10:
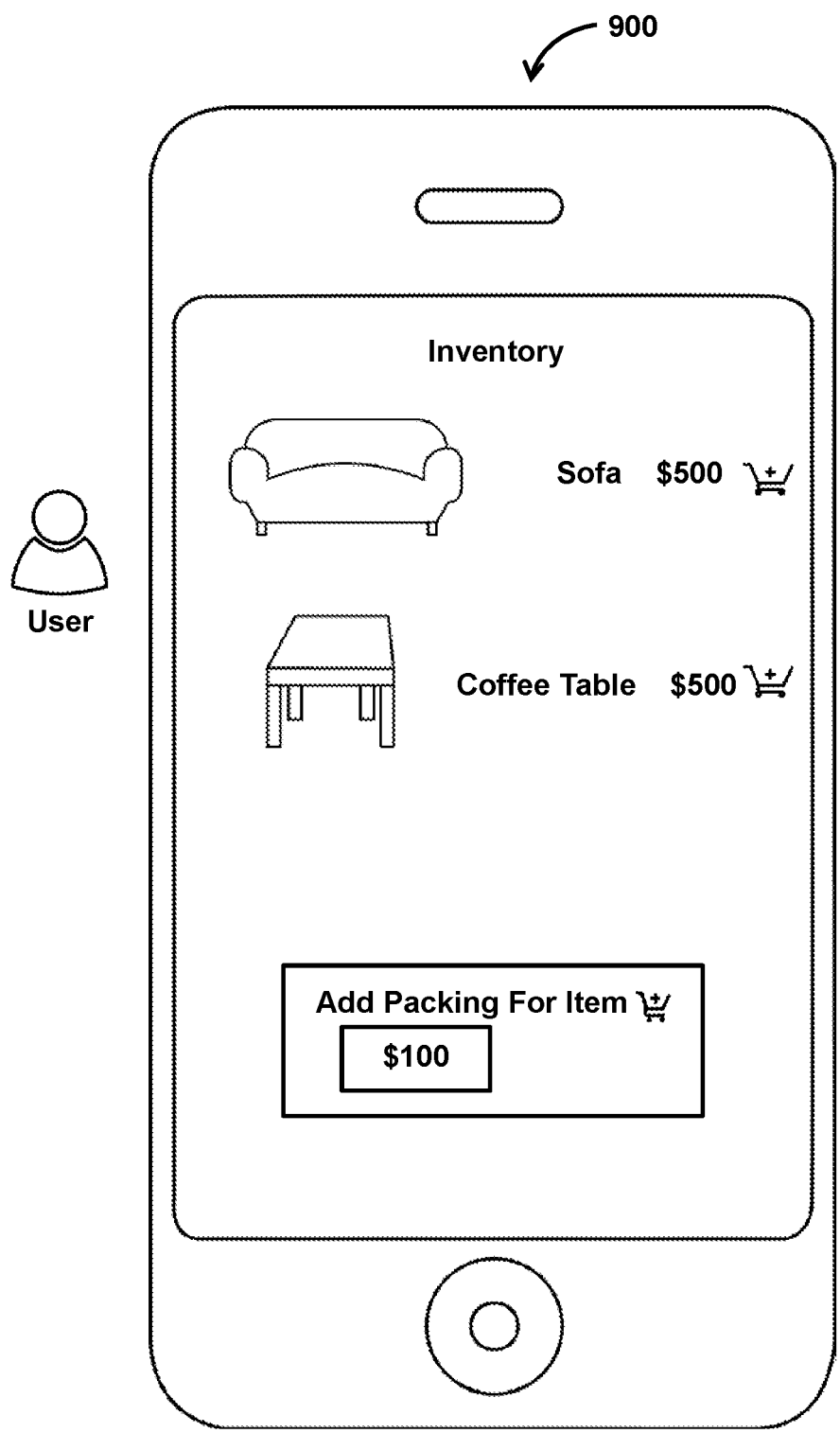
FIG. 10 illustrates additional services, in accordance with one or more implementations.

FIG. 10 illustrates the device 900 showing additional services, in accordance with one or more implementations. When a user adds an item to the cart, auxiliary services may pop up (e.g., a prompt to package the item and/or cost where the cost is dependent on the item, detection algorithm, premium quality paint, multiple coats needed, and/or other services).

Figure 11:
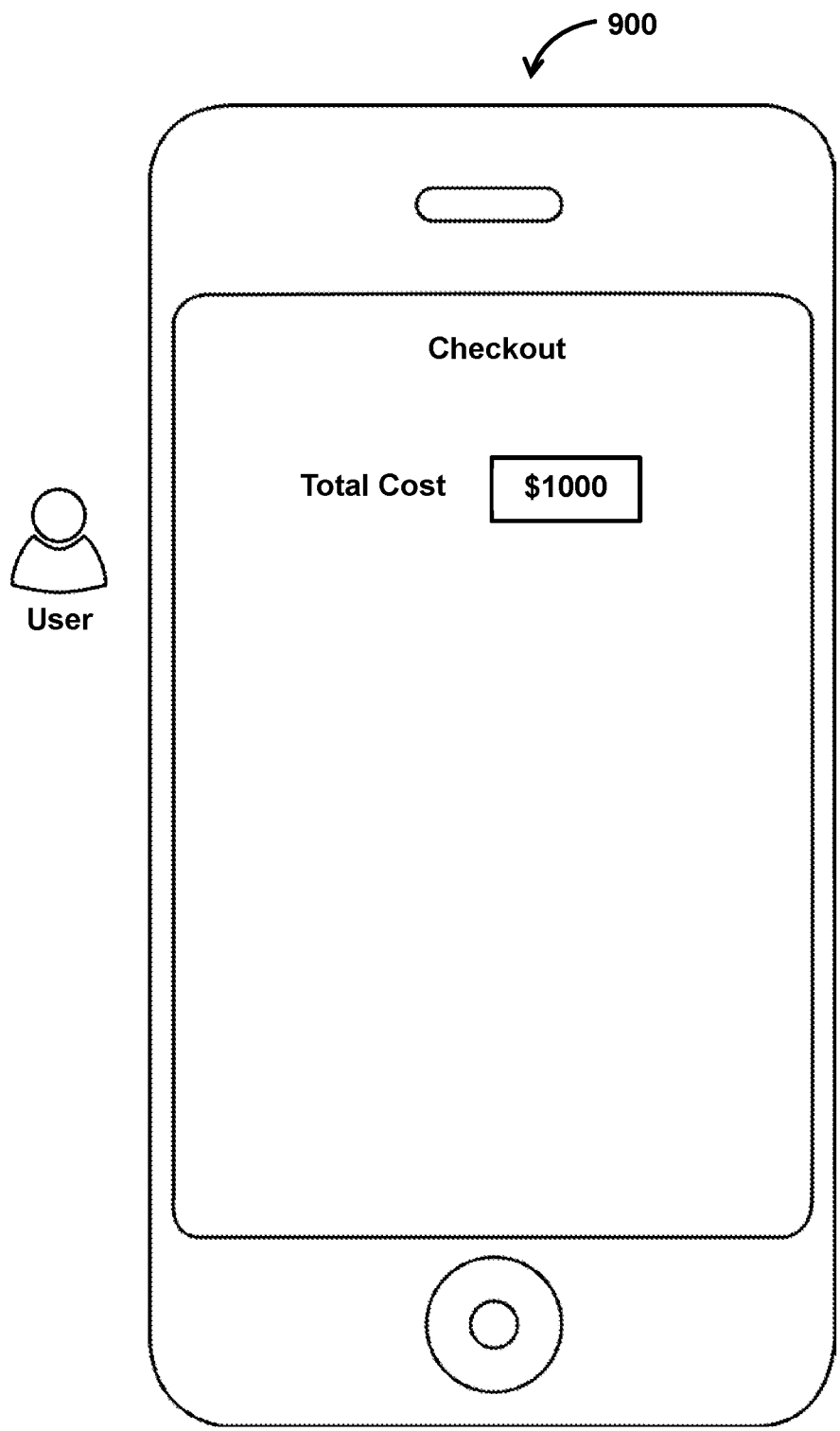
FIG. 11 illustrates a completed transaction, in accordance with one or more implementations.

FIG. 11 illustrates the device 900 showing a completed transaction, in accordance with one or more implementations. The user may pay for the needed services in the app. The information may be transmitted to the service provider.

Figure 12:
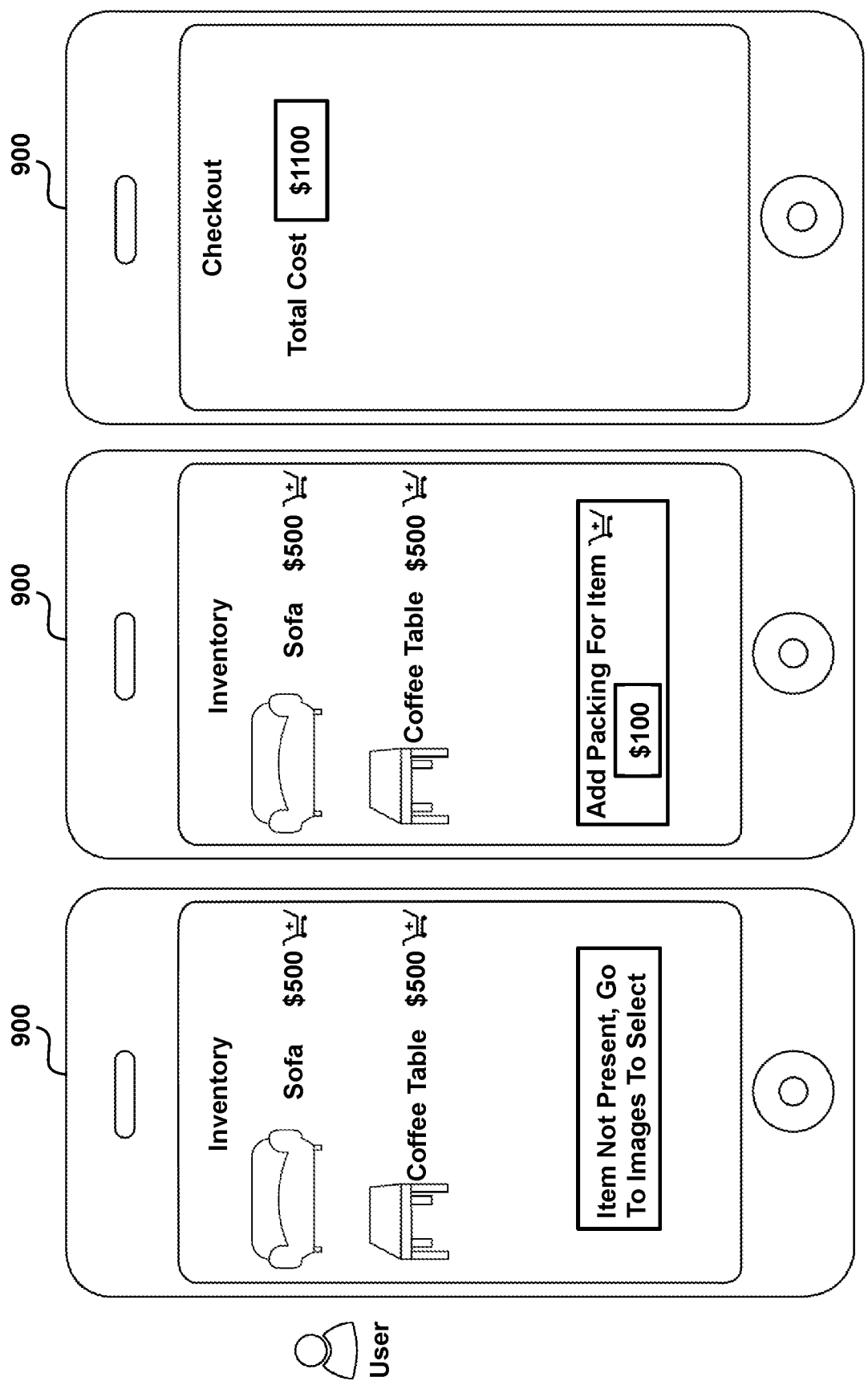
FIG. 12 illustrates providing AI-based cost estimates for services, in accordance with one or more implementations.

FIG. 12 illustrates providing AI-based cost estimates for services, in accordance with one or more implementations.

Figure 13:
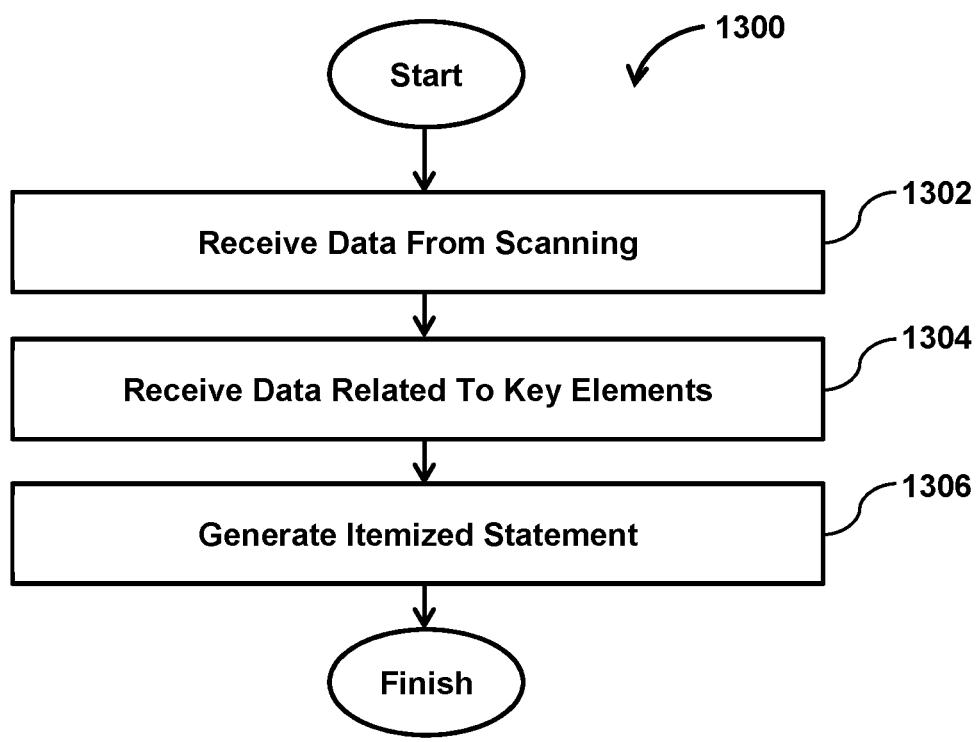
FIG. 13 illustrates a method for providing AI-based cost estimates for services, in accordance with one or more implementations.

FIG. 13 illustrates a method 1300 for providing AI-based cost estimates for services, in accordance with one or more implementations. The operations of method 1300 presented below are intended to be illustrative. In some implementations, method 1300 may be accomplished with one or more additional operations not described, and/or without one or more of the operations discussed. Additionally, the order in which the operations of method 1300 are illustrated in FIG. 13 and described below is not intended to be limiting.

In some implementations, method 1300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 1302, data from a scanning of a location may be received, at one or more hardware processors. The scanning performed by one or more of a camera, a computer vision device, an inertial measurement unit, or a depth sensor. Operation 1302 may be performed by one or more hardware processors configured to execute a machine-readable instruction component that is the same as or similar to receiving scanned data component 108 (as described in connection with FIG. 1), in accordance with one or more implementations.

At an operation 1304, data may be received, at one or more hardware processors, related to the identification of one or more key elements at the location. Operation 1304 may be performed by one or more hardware processors configured to execute a machine-readable instruction component that is the same as or similar to receiving key element data component 110 (as described in connection with FIG. 1), in accordance with one or more implementations.

At an operation 1306, an itemized statement and quote of work to be performed may be generated at one or more processors. Operation 1306 may be performed by one or more hardware processors configured to execute a machine-readable instruction component that is the same as or similar to generate statement component 112 (as described in connection with FIG. 1), in accordance with one or more implementations.

Figure 14:
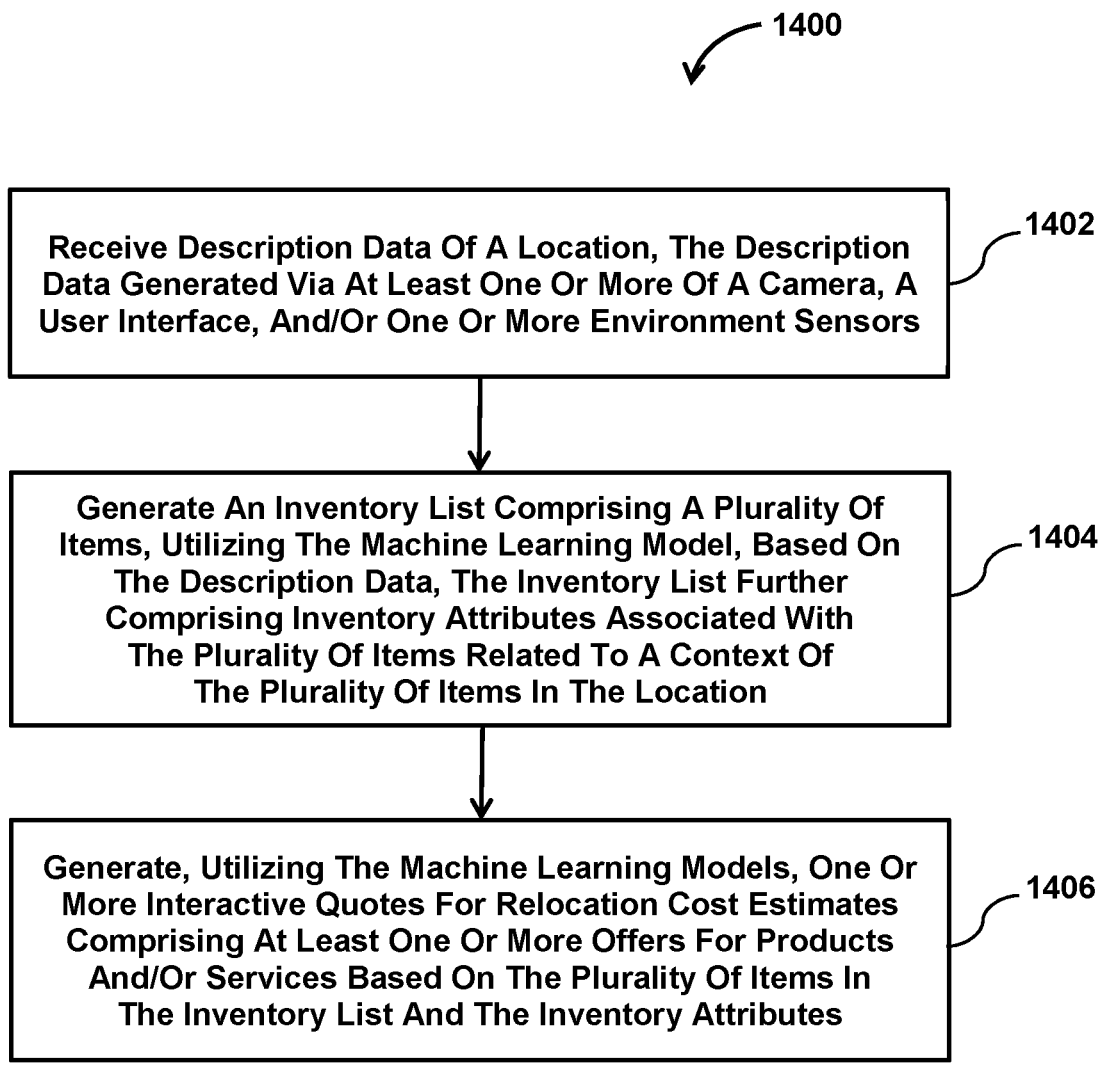
FIG. 14 illustrates a method for providing AI-based relocation cost estimates for services and products, in accordance with one or more implementations.

FIG. 14 illustrates a method 1400 for providing AI-based cost estimates for services, in accordance with one or more implementations. The operations of method 1400 presented below are intended to be illustrative. In some implementations, method 1400 may be accomplished with one or more additional operations not described, and/or without one or more of the operations discussed. Additionally, the order in which the operations of method 1400 are illustrated in FIG. 14 and described below is not intended to be limiting.

In some implementations, method 1400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1400 in response to instructions stored electronically on an electronic storage medium. The one or more processing devices may include one or more devices configured through hardware, firmware, and/or software to be specifically designed for execution of one or more of the operations of method 1400.

At an operation 1402, method 1400 may start and receive description data of a location, the description data generated via at least one or more of a camera, a user interface, and/or one or more environment sensors. Operation 1402 may be performed by one or more hardware processors configured to execute a machine-readable instruction component that is the same as or similar to receiving scanned data component 108 (as described in connection with FIG. 1), in accordance with one or more implementations.

At an operation 1404, method 1400 generates an inventory list comprising a plurality of items, utilizing the machine learning model, based on the description data, the inventory list further comprising inventory attributes associated with the plurality of items related to a context of the plurality of items in the location. Operation 1404 may be performed by one or more hardware processors configured to execute a machine-readable instruction component that is the same as or similar to receiving key element data component 110 (as described in connection with FIG. 1), in accordance with one or more implementations.

At an operation 1406, method 1400 generates, utilizing the machine learning models, one or more interactive quotes for relocation cost estimates comprising at least one or more offers for products and/or services based on the plurality of items in the inventory list and the inventory attributes. Operation 1406 may be performed by one or more hardware processors configured to execute a machine-readable instruction component that is the same as or similar to generate statement component 112 (as described in connection with FIG. 1), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

While many of the exemplary implementations of the present invention have been described as discussed above, other exemplary implementations may also be contained within the scope and spirit of the present disclosure and are included below in appendix A.

What is claimed is:

1. A system comprising:
one or more hardware processors configured by machine-readable instructions to:
receive, from a client computing device via a computer network, description data associated with a house, building or structure, the description data generated by a camera of the client computing device;
determine, by the one or more hardware processors, whether the description data, acquired with at least the camera, clearly acquired the plurality of items;
generate, by the one or more hardware processors in response to at least one of the plurality of items determined as being unclear, a user directive at the client device instructing a user to change the description data, the user directive comprising one or more UI elements, voice, text, or haptic feedback;
determine a location of the at least one of the plurality of items based on the description data from the camera, user input, or data from one or more environment sensors;
generate, utilizing a machine learning model executed by the one or more hardware processors, a plurality of inventory attributes associated with a plurality of items within the house, building, or structure, based on the received description data, wherein the inventory attributes comprise at least one of a size, weight, dimension, location, or object class of at least a portion of the plurality of items, wherein the determining of the inventory attributes of the at least one of the plurality of items utilizes the determined location;
generate, utilizing a machine learning model executed by the one or more hardware processors, an inventory list comprising a plurality of items based on the received description data and the inventory attributes;
generate, utilizing the machine learning model executed by the one or more hardware processors, one or more quotes associated with the house, building, or structure based on the plurality of items in the inventory list and the inventory attributes; and
cause display, at a display screen of the client device, of at least one of the inventory attributes or a user-interface (UI) element.

2. The system of claim 1, the client computing device further comprising a depth sensor, the instructions further causing the one or more processors to:
receive depth sensor data from the depth sensor, wherein the depth sensor data is utilized by the machine learning model.

3. The system of claim 1, the instructions further causing the one or more processors to determine dimensions of the items.

4. The system of claim 1, wherein the one or more quotes comprise one or more of a relocation cost estimate, and add-on relocation services and/or products comprising at least one or more of packing/unpacking services, dismantling/assembling, junk removal, donations, reseller marketplaces, packaging material, insurance/maintenance contracts on service.

5. The system of claim 1, the instructions further causing the one or more processors to adjust the one or more quotes based on at least one or more of historical and/or projected data for weather, road conditions, and demand for service.

6. The system of claim 1, the instructions further causing the one or more processors to send the inventory list to an insurance company for receiving an insurance quote.

7. The system of claim 1, wherein the one or more quotes include an actual cost and/or a replacement cost of an item in the inventory list.

8. The system of claim 1, wherein the user directive comprises an indication to change the description data determined based on the user's location and a camera angle.

9. A computer program product comprising a non-transitory, machine-readable medium storing instructions which, when executed by at least one programmable processor, cause the at least one programmable processor to perform operations comprising:
receive, from a client computing device via a computer network, description data associated with a house, building or structure, the description data generated by a camera of the client computing device;
determine, by the one or more hardware processors, whether the description data, acquired with at least the camera, clearly acquired the plurality of items;
generate, by the one or more hardware processors in response to at least one of the plurality of items determined as being unclear, a user directive at the client device instructing a user to change the description data, the user directive comprising one or more UI elements, voice, text, or haptic feedback;
determine a location of the at least one of the plurality of items based on the description data from the camera, user input, or data from one or more environment sensors;
generate, utilizing a machine learning model executed by the one or more hardware processors, a plurality of inventory attributes associated with a plurality of items within the house, building, or structure, based on the received description data, wherein the inventory attributes comprise at least one of a size, weight, dimension, location, or object class of at least a portion of the plurality of items, wherein the determining of the inventory attributes of the at least one of the plurality of items utilizes the determined location;
generate, utilizing a machine learning model executed by the one or more hardware processors, an inventory list comprising a plurality of items based on the received description data and the inventory attributes;
generate, utilizing the machine learning model executed by the one or more hardware processors, one or more quotes associated with the house, building, or structure based on the plurality of items in the inventory list and the inventory attributes; and
cause display, at a display screen of the client device, of at least one of the inventory attributes or a user-interface (UI) element.

10. The computer program product of claim 9, the client computing device further comprising a depth sensor, the instructions further causing the one or more processors to:
receive depth sensor data from the depth sensor, wherein the depth sensor data is utilized by the machine learning model.

11. The computer program product of claim 9, the instructions further causing the one or more processors to determine dimensions of the items.

12. The computer program product of claim 9, wherein the one or more quotes comprise one or more of a relocation cost estimate, and add-on relocation services and/or products comprising at least one or more of packing/unpacking services, dismantling/assembling, junk removal, donations, reseller marketplaces, packaging material, insurance/maintenance contracts on service.

13. The computer program product of claim 9, the instructions further causing the one or more processors to adjust the one or more quotes based on at least one or more of historical and/or projected data for weather, road conditions, and demand for service.

14. The computer program product of claim 9, the instructions further causing the one or more processors to send the inventory list to an insurance company for receiving an insurance quote.

15. The computer program product of claim 9, wherein the one or more quotes include an actual cost and/or a replacement cost of an item in the inventory list.

16. The computer program product of claim 9, wherein the user directive comprises an indication to change the description data determined based on the user's location and a camera angle.

* * * * *